US010447564B2

(12) United States Patent
Abraham et al.

(10) Patent No.: US 10,447,564 B2
(45) Date of Patent: *Oct. 15, 2019

(54) SYSTEMS FOR AND METHODS OF USER DEMOGRAPHIC REPORTING USABLE FOR IDENTIFIYING USERS AND COLLECTING USAGE DATA

(71) Applicant: comScore, Inc., Reston, VA (US)

(72) Inventors: Magid M. Abraham, Great Falls, VA (US); Jeffrey Carnes, Crystal Lake, IL (US); Jason Disch, Leesburg, VA (US); James Larrison, Alexandria, VA (US)

(73) Assignee: comScore, Inc., Reston, VA (US)

( * ) Notice: Subject to any disclaimer, the term of this patent is extended or adjusted under 35 U.S.C. 154(b) by 241 days.

This patent is subject to a terminal disclaimer.

(21) Appl. No.: 14/292,037

(22) Filed: May 30, 2014

(65) Prior Publication Data

US 2014/0280923 A1    Sep. 18, 2014

Related U.S. Application Data

(63) Continuation of application No. 13/078,667, filed on Apr. 1, 2011, now Pat. No. 8,751,461, which is a
(Continued)

(51) Int. Cl.
*G06F 16/30*    (2019.01)
*H04L 12/26*    (2006.01)
(Continued)

(52) U.S. Cl.
CPC ..... *H04L 43/0876* (2013.01); *G06Q 10/0637* (2013.01); *G06Q 30/02* (2013.01); *G06Q 30/0203* (2013.01); *G06Q 30/0204* (2013.01)

(58) Field of Classification Search
CPC ............................................. G06F 17/30861
See application file for complete search history.

(56) References Cited

U.S. PATENT DOCUMENTS 4,355,372 A    10/1982    Johnson et al.
RE31,951 E    7/1985    Johnson
(Continued)

FOREIGN PATENT DOCUMENTS

GB    2184576 A    6/1987
WO    WO9641495 A1    12/1996
(Continued)

OTHER PUBLICATIONS

Office Action dated Jul. 23, 2008, For U.S. Appl. No. 10/358,377.
(Continued)

*Primary Examiner* — Jeff A Burke
*Assistant Examiner* — Cindy Nguyen
(74) *Attorney, Agent, or Firm* — Baker & Hostetler LLP

(57) ABSTRACT

Several ways of identifying users and collecting demographic information and market information are disclosed, including branding a browser with a unique identification in each user request, identifying a user by his key strokes or mouse clicks, gathering demographic information using multiple data sets and by monitoring network traffic. Additionally, user requested content is distinguished from other, non-user content, and the performance of a server can be monitor and analyzed from a client a client perspective. Further, an Internet user's Internet data is routed to a known domain on the Internet, from which it is routed on to the intended recipient. The domain includes proxy servers which proxy the user's data requests to the domain, and database servers, which filter and build a database of the user's Internet usage. Particular data concerning certain behaviors of interest, such as purchasing data, is filtered into the database, and can form the basis for numerous market measures.

17 Claims, 24 Drawing Sheets

Related U.S. Application Data continuation of application No. 10/358,377, filed on Feb. 5, 2003, now Pat. No. 7,930,285, which is a continuation-in-part of application No. 09/532,890, filed on Mar. 22, 2000, now Pat. No. 7,181,412.

(60) Provisional application No. 60/355,785, filed on Feb. 12, 2000, provisional application No. 60/353,993, filed on Feb. 5, 2002.

(51) Int. Cl.
  *G06Q 10/06* (2012.01)
  *G06Q 30/02* (2012.01)

(56) References Cited

U.S. PATENT DOCUMENTS

| | | |
|---|---|---|
| 4,603,232 A | 7/1986 | Kurland |
| 4,621,334 A | 11/1986 | Garcia |
| 4,805,222 A | 2/1989 | Young |
| 4,954,699 A | 9/1990 | Coffey |
| 4,958,284 A | 9/1990 | Bishop |
| 5,023,929 A | 6/1991 | Call |
| 5,060,140 A | 10/1991 | Brown |
| 5,481,294 A | 1/1996 | Thomas |
| 5,488,408 A | 1/1996 | Maduzia et al. |
| 5,526,427 A | 6/1996 | Thomas et al. |
| 5,550,928 A | 8/1996 | Lu et al. |
| 5,557,686 A | 9/1996 | Brown et al. |
| 5,584,050 A | 12/1996 | Lyons |
| 5,594,934 A | 1/1997 | Lu |
| 5,659,469 A | 8/1997 | Deaton et al. |
| 5,675,510 A | 10/1997 | Coffey et al. |
| 5,710,887 A | 1/1998 | Chelliah |
| 5,715,399 A | 2/1998 | Bezos |
| 5,727,159 A | 3/1998 | Kikinis |
| 5,737,025 A | 4/1998 | Dougherty |
| 5,737,026 A | 4/1998 | Lu |
| 5,751,450 A | 5/1998 | Robinson |
| 5,771,307 A | 6/1998 | Lu et al. |
| 5,781,913 A | 7/1998 | Felsenstein |
| 5,805,803 A | 9/1998 | Birrell et al. |
| 5,835,712 A | 11/1998 | DuFresne |
| 5,850,249 A | 12/1998 | Massetti |
| 5,862,325 A | 1/1999 | Reed |
| 5,870,546 A | 2/1999 | Kirsch |
| 5,872,850 A | 2/1999 | Klein |
| 5,887,140 A | 3/1999 | Itsumi |
| 5,889,548 A | 3/1999 | Chan |
| 5,897,616 A | 4/1999 | Kanevsky |
| 5,918,014 A | 6/1999 | Robinson |
| 5,941,957 A | 8/1999 | Ingrassia |
| 5,945,988 A | 8/1999 | Williams |
| 5,961,593 A | 10/1999 | Gabber |
| 5,970,469 A | 10/1999 | Scroggie |
| 5,983,348 A | 11/1999 | Ji |
| 5,987,454 A | 11/1999 | Hobbs |
| 5,991,735 A | 11/1999 | Gerace |
| 6,006,197 A | 12/1999 | d Eon |
| 6,006,260 A | 12/1999 | Barrick |
| 6,012,090 A | 1/2000 | Chung et al. |
| 6,018,619 A | 1/2000 | Allard |
| 6,021,439 A | 2/2000 | Turek et al. |
| 6,026,368 A | 2/2000 | Brown |
| 6,049,821 A | 4/2000 | Theriault |
| 6,052,730 A | 4/2000 | Felciano |
| 6,058,381 A | 5/2000 | Nelson |
| 6,062,474 A | 5/2000 | Kroll |
| 6,070,145 A | 5/2000 | Pinsley |
| 6,073,241 A | 6/2000 | Rosenberg |
| 6,081,900 A | 6/2000 | Subramaniam |
| 6,094,673 A | 7/2000 | Dilip |
| 6,115,680 A | 9/2000 | Coffee |
| 6,128,624 A | 10/2000 | Papierniak |
| 6,138,162 A | 10/2000 | Pistriotto |
| 6,141,694 A | 10/2000 | Gardner |
| 6,141,759 A | 10/2000 | Braddy |
| 6,151,593 A | 11/2000 | Cho |
| 6,157,618 A | 12/2000 | Boss |
| 6,182,141 B1 | 1/2001 | Blum |
| 6,193,153 B1 | 2/2001 | Lambert |
| 6,205,432 B1 | 3/2001 | Gabbard |
| 6,212,565 B1 | 4/2001 | Gupta |
| 6,225,995 B1 | 5/2001 | Jacobs |
| 6,256,644 B1 | 7/2001 | Shibayama |
| 6,256,664 B1 | 7/2001 | Donoho et al. |
| 6,256,737 B1 | 7/2001 | Bianco |
| 6,263,371 B1 | 7/2001 | Geagan |
| 6,286,046 B1 | 9/2001 | Bryant |
| 6,338,066 B1 | 1/2002 | Martin |
| 6,351,810 B2 | 2/2002 | Gupta |
| 6,381,632 B1 | 4/2002 | Lowell |
| 6,385,590 B1 | 5/2002 | Levine |
| 6,389,403 B1 | 5/2002 | Dorak |
| 6,389,462 B1 | 5/2002 | Cohen |
| 6,421,724 B1* | 7/2002 | Nickerson ........... G06F 3/04847 709/219 |
| 6,421,733 B1 | 7/2002 | Tso |
| 6,438,125 B1 | 8/2002 | Brothers |
| 6,442,529 B1 | 8/2002 | Krishan |
| 6,442,687 B1 | 8/2002 | Savage |
| 6,449,739 B1 | 9/2002 | Landan |
| 6,453,335 B1 | 9/2002 | Kaufmann |
| 6,463,457 B1 | 10/2002 | Sletten |
| 6,567,854 B1 | 5/2003 | Olshansky |
| 6,567,857 B1 | 5/2003 | Gupta |
| 6,584,567 B1 | 6/2003 | Bellwood |
| 6,606,581 B1 | 8/2003 | Nickerson |
| 6,622,169 B2 | 9/2003 | Kikinis |
| 6,678,685 B2 | 1/2004 | McGill |
| 6,684,194 B1 | 1/2004 | Eldering |
| 6,694,431 B1 | 2/2004 | Binding |
| 6,704,787 B1 | 3/2004 | Umbreit |
| 6,760,763 B2 | 7/2004 | Jennings |
| 6,839,680 B1 | 1/2005 | Liu |
| 6,856,963 B1 | 2/2005 | Hurwitz |
| 6,857,009 B1 | 2/2005 | Ferreria et al. |
| 6,883,032 B1 | 4/2005 | Dempski |
| 6,892,235 B1 | 5/2005 | Daude et al. |
| 7,020,700 B1 | 3/2006 | Bennett et al. |
| 7,039,599 B2 | 5/2006 | Merriman |
| 7,080,077 B2 | 7/2006 | Ramamurthy |
| 7,092,296 B2 | 8/2006 | Kato et al. |
| 7,092,926 B2 | 8/2006 | Cerrato |
| 7,146,505 B1 | 12/2006 | Harada |
| 7,181,412 B1 | 2/2007 | Fulgoni |
| 7,243,129 B1 | 7/2007 | Thomas |
| 7,324,953 B1* | 1/2008 | Murphy ................ G06Q 30/02 705/500 |
| 7,930,285 B2 | 4/2011 | Abraham et al. |
| 8,751,461 B2 | 6/2014 | Abraham et al. |
| 2001/0014868 A1 | 8/2001 | Herz |
| 2001/0014915 A1 | 8/2001 | Blumenau |
| 2001/0020242 A1 | 9/2001 | Gupta |
| 2001/0034638 A1 | 10/2001 | Kelley |
| 2002/0023004 A1* | 2/2002 | Hollander ............ G06Q 20/203 705/22 |
| 2002/0032602 A1* | 3/2002 | Lanzillo, Jr. ........... G06Q 30/02 705/14.66 |
| 2002/0062223 A1* | 5/2002 | Waugh .................... G06Q 30/02 705/1.1 |
| 2002/0069368 A1 | 6/2002 | Hines |
| 2002/0077903 A1 | 6/2002 | Feldman |
| 2002/0099605 A1 | 7/2002 | Weitzman |
| 2002/0099832 A1 | 7/2002 | Yaegerman |
| 2002/0116266 A1 | 8/2002 | Marshall |
| 2002/0124074 A1* | 9/2002 | Levy ................ G06F 11/3495 709/224 |
| 2002/0128803 A1 | 9/2002 | Skinner |
| 2002/0128925 A1 | 9/2002 | Angeles |
| 2002/0178257 A1 | 11/2002 | Cerrato |
| 2003/0009762 A1 | 1/2003 | Hooper |
| 2003/0018778 A1 | 1/2003 | Martin |
| 2003/0033432 A1 | 2/2003 | Simpson |

(56) References Cited

U.S. PATENT DOCUMENTS

| | | |
|---|---|---|
| 2003/0065595 A1 | 4/2003 | Anglum |
| 2003/0076305 A1 | 4/2003 | Allen |
| 2003/0083938 A1* | 5/2003 | Smith .................... G06Q 30/02 |
| | | 705/14.53 |

FOREIGN PATENT DOCUMENTS

| | | |
|---|---|---|
| WO | WO9831155 A2 | 7/1998 |
| WO | 00/55783 A1 | 9/2000 |
| WO | WO0054214 A1 | 9/2000 |
| WO | WO0171620 A1 | 9/2001 |
| WO | WO0152462 A3 | 1/2002 |
| WO | WO0250694 A1 | 6/2002 |
| WO | WO03067376 A3 | 12/2003 |

OTHER PUBLICATIONS

Office Action dated Dec. 18, 2008, for U.S. Appl. No. 10/358,377.
Office Action for U.S. Appl. No. 10/358,377, mailed Sep. 9, 2009.
Office Action for U.S. Appl. No. 11/836,075, mailed Dec. 8, 2009, 27 pages.
Non-final Office Action mailed Oct. 17, 2008 in U.S. Appl. No. 11/619,795 (30 pages).
Final Office Action mailed Jun. 2, 2009 in U.S. Appl. No. 11/619,795 (41 pages).
Non-final Office Action mailed Apr. 28, 2010 in U.S. Appl. No. 10/358,377 (25 pages).
Final Office Action for U.S. Appl. No. 11/836,075, mailed Aug. 17, 2010, 26 pages.
U.S. Notice of Allowance mailed Dec. 3, 2010 in U.S. Appl. No. 10/356,377 (19 pages).
U.S. Advisory Action mailed Sep. 24, 2009 in U.S. Appl. No. 11/619,795, 3 pages.
Office Action issued in U.S. Appl. No. 11/836,075 on Nov. 29, 2012, 46 pages.
Office Action issued in U.S. Appl. No. 12/347,464 on Jun. 5, 2013, 56 pages.
Office Action issued in U.S. Appl. No. 13/078,667 on Jul. 2, 2012, 42 pages.
Office Action issued in U.S. Appl. No. 13/078,667 on Feb. 4, 2013, 38 pages.
Office Action issued in U.S. Appl. No. 13/078,667 on Aug. 1, 2013, 15 pages.
Notice of Allowance issued in U.S. Appl. No. 13/078,667 on Jan. 9, 2014, 13 pages.
Office Action issued in U.S. Appl. No. 12/347,464 on Apr. 7, 2014, 26 pages.
Bascou, Jean-Jacques & Redon, Laurence, "Improving Security by Analysing Users' Behavior," in Proceedings of the Pacific Telecommunications Council Seventeenth Annual Conference 615 (Dan J. Wedemeyer & Richard Nickelson eds. 1995).
Boyan, J. "The Anonymizer—Protecting User Privacy on the Web," Computer-Mediated Communication Magazine, Online! 1997, XP002231197, http://www.december.com/cmc/mag/1997/sep/toc.html, retrieved on 1997.
Brad Hill, WebTV for Dummies, "Creating Famliy Accounts" (Foster City, CA, 2000), pp. 69-72.
Chan, Yuen-Yan, "On privacy issues of Internet access services via proxy servers," Secure Networking—Core 'Secure!' 99, Internationai Exhibition and Congress. Proceedings (Lecture Notes in Computer Science vol. 1740) Springer-Verlag Berlin, Germany, 1999, pp. 183-191, XP09055060.
Chapman D. B. et al., "Building Internet Firewalls Proxy Systems," Building Internet Firewalls, Sep. 1995 (Sep. 1995), pp. 189-205, XP002911985.
Choo C. W. et al. "A behavioral model of information seeking on the Web: preliminary results of a study of how managers and IT specialists use the Web" ASIS'98, Information Access in The Global Information Economy. Proceedings of the 61st Annual Meeting of the American Society for Information Science, vol. 35, Inf. Today Medford, NJ, USA, 1998, pp. 290-302, XP009056075.
Diffie W. et al., "Privacy and Authentication: An Introduction to Crytopgraphy" Proceedings of the IEEE, IEEE. New York, US, vol. 67, No. 3, Mar. 1979 (Mar. 1979), pp. 397-426, XP000575227.
Dossick, S. E et al., "WWW access to legacy client/server applications," Computer Networks and ISDN Systems, North Holland Publishing, Amsterdam, NL, vol. 28, No. 11, May 1996 (May 1996), pp. 931-940, XP004018197.
Expert Report of Dr. Benjamin Goldberg re Invalidity Exhibit C to Expert Report, Civil Action No. 1:11-cv-290-LMB-TRJ, Jul. 1, 2011 (36 pages).
Expert Report: of Dr. Benjamin Goldberg re Invalidity Exhibit D, Civil Action No. 1:11-cv-290-LMB-TRJ, Jul. 1, 2011 (24 pages).
Expert Report of Dr. Benjamin Goldberg re Invalidity, Civil Action No. 1:11-cv-290-LMB-TRJ, Jul. 1, 2011 (119 pages).
Furnell et al., "A comprehensive authentication and supervision architecture for networked multimedia systems," in Communications and Multimedia Security vol. 3 227 (Sokratis K Katsikas ed. 1997).
Furnell et al., "Applications of keystroke analysis for improved login security and continuous user authentication," in Information Systems Security 283 (Sokratis K. Katsikas & Dirmtris Gritzalis eds. 1996).
Goldberg Reply Expert Report re Invalidity, Civil Action No. 1:11-cv-290-LMB-TRJ, Aug. 5, 2011 (78 pages).
Goldberg Supplemental Expert Report re Invalidity (*comScore* v. *Nielsen*), Civil Action No. 1:11-cv-290-LMB-TRJ, Aug. 12, 2011 (13 pages).
Goldberg Supplemental Expert Report re Invalidity Exhibit 1, Civil Action No. 1:11-cv-290-LMB-TRJ, Aug. 12, 2011 (190 pages).
Goldberg Supplement Expert Report re Invalidity Exhibit 2, civil Action No. 1:11-cv-290-LMB-TRJ, Aug. 12, 2011 (80 pages).
Goldberg Supplemental Expert Report re Invalidity Exhibit 3, Civil Action No. 1:11-cv-290-LMB-TRJ, Aug. 12, 2011 (2 pages).
Goldberg Supplemental Expert Report re Invalidity Exhibit 4, Civil Action No. 1:11-cv-290-LMB-TRJ, Aug. 12, 2011 (4 pages).
Goldberg Supplemental Expert Report re Invalidity Exhibit 5, Civil Action No. 1:11-cv-290-LMB-TRJ, Aug. 12, 2011 (4 pages).
Goldberg Supplemental Expert Report re Invalidity Exhibit 6, Civil Action No. 1:11-cv-290-LMB-TRJ, Aug. 12, 2011 (3 pages).
Goldberg Supplemental Expert Report re Invalidity Exhibit 7, Civil Action No. 1:11-cv-290-LMB-TRJ, Aug. 12, 2011 (4 pages).
Goldberg Supplemental Expert Report re Invalidity Exhibit 8, Civil Action No. 1:11-cv-290-LMB-TRJ, Aug. 12, 2011 (5 pages).
Hargittai, Eszter, "Beyond Logs and Surveys: In-Depth Measures of People's Web Use Skills," Journal of the American Society of Information Science and Technology, vol. 53, No. 14, pp. 1239-1244, 2002.
Lee, J. et al., "Visualization and Analysis of Clickstream Data of Online Stores for Understanding Web Merchandising," IBM Institute of Advanced Commerce Technical Papers, Online!, Jan. 1, 2000 (Jan. 1, 2000), XP002208026, http://www.research.ibm.com/iac/papers/Iee.pdf, retrieved on 2000.
Leggett et al., "Dynamic identity verification via keystroke characteristics," in Int. J. Man-Machine Studies 859 (1991).
Leggett et al., "Verification of User Identity via Keyboard Characteristics," in Human Factors in Management Information Systems 29 (Jane M. Carey ed. 1988).
Mambo, M. et al., "Proxy Cryptosystems: Delegation of the Power to Decrypt Ciphertexts" IEICE Transactions of Fundamentals of Electronics, Communications and Computer Sciences, Institute of Electronics Information and Comm. Eng. Tokyo, JP, vol. E80-A, No. 1, Jan. 1997 (Jan. 1997), pp. 54-63, XP000742245.
Monrose, F., et al, 'Authentication via keystroke dynamics', ACM Press, 1997, entire document, http://delivery.acm.org/10.1145/270000/266434/p48-monrose.pdf?key1=266434&key2=9684754711&coll=portal&dl=ACM&CFID=14258302&CFTOKEN=37117304.
Monrose, F., et al., "Keystroke dynamics as a biometric for authentication," Future Generation Computer Systems 16 (2000) 351-359, XP4185847.
Oppliger, R. "Privacy protection and anonymity services for the World Wide Web (WWW)," Future Generations Computer Systems,

(56) References Cited

OTHER PUBLICATIONS

Elsevier Science Publishers, Amsterdam, NL, vol. 16, No. 4, Feb. 2000 (Feb. 2000), pp. 379-391, XP004185850.
Sadun, Erica et al , WebTV, "Administrating Your WebTV Account" (Foster City, CA, 2000), pp. 311-319.
Song et al., "User Recognition by Keystroke Latency Pattern Analysis" (1998).
Srivastava, J., et al. "Web Usage Mining: Discovery and Applications of Usage Patterns from Web Data" ACM SIGKDD Explorations Newsletter, vol. 1, Issue 2, pp. 12-33, Jan. 2000.
Zaiane O. R. et al., "Discovering Web access patterns and trends by applying OLAP and data mining technology on Web logs," Research and Technology Advances in Digital Libraries, 1998, ADL 98, Proceedings, IEEE International Forum on Santa Barbara, CA, US Apr. 22-24, 1998, Los Alamitos, CA, USA, IEEE Compt. Soc, US, Apr. 22, 1998 (Apr. 22, 1998), pp. 19-29, XP010276880.
Zenel, B.. "A General Purpose Proxy Filtering Mechanism Applied to the Mobile Environment," Wireless Networks, ACM, US, vol. 5, No. 5, Oct. 1999 (Oct. 1999), pp. 391-409, XP000902494.
International Search Report mailed Nov. 8, 2005 for International Application No. EP 01922473.
Search Report for PCT Appliation Serial No. PCT/US03/03225.
Supplementary Search for EP Application Serial No. 01922473.2 mailed Aug. 11, 2005.
Supplementary European Search Report for European Application No. EP 03 73 7601 mailed Nov. 10, 2008, 3 pages.
European First Examination Report for Patent Application No. 03737601.9 dated May 4, 2010 (5 pages).
European Examination Report for Application No. 03737601.9 mailed Mar. 15, 2011 (5 pages).
Memo Concerning Mexican Office Action for Application No. PA/a/2002/009205, Oct. 9, 2006 (2 pages).
Canadian Officee Action for Application No. 2,474,815 dated Jun. 9, 2009, 2 pages.
Canadian Office Action for Application No. 2,474,815 dated May 18, 2011, 3 pages.
Canadian Office Action for Application No. 2,474,815 dated Dec. 4, 2007, 3 pages.
Supplementary European Search Report for Application No. 0373601.9 mailed Nov. 10, 2008 (3 pages).
European Paten t Office Summon to attend oral proceedings pursuant to Rule 115(1) EPC for Application No. 03737601.9 mailed Nov. 8, 2011, 8 pages.
Canadian Office Action for Application No. 2,403,879 dated Dec. 8, 2011, 4 pages.
Canadian Office for Application No. 2,403,879 dated Jun. 3, 2013, 5 pages.

\* cited by examiner

REGISTRATION DATA

| Panelist_id/<br>member_id | first_name | last_name | email | gender | birth_year |
|---|---|---|---|---|---|
| sample | george | bush | gwbush@whitehouse.com | m | 1946 |

UDR "DICTIONARY"

| Panelist_id/<br>member_id | string_type | string | match | source |
|---|---|---|---|---|
| sample | 1 | george | 1 | r |
| sample | 2 | bush | 1 | r |
| sample | 3 | gwbush@whitehouse.com | 1 | r |
| sample | 4 | m | 1 | r |
| sample | 5 | 1946 | 1 | r |

FIG. 6A

MATCHED WITHIN UDR "DICTIONARY"

| UDR "Dictionary" Before... | Transaction Data... | UDR Dictionary" After... |
|---|---|---|
| browser_id string_typ string match source | browser_l string_ty strin sourc | browser_id string_typ strin matc sourc |
| sample 1 george1 1 | sampl 1 georg 2 | sampl 1 |
| | | georg 2 1 |

FIG. 6B

MATCHED WITHIN UDR "DICTIONARY"

*UDR "Dictionary" Before...* | *Transaction Data...* | *UDR "Dictionary" After...*

| browser_id | string_typ | string | match | source | browser_i | string_ty | strin | sourc | browser_id | string_typ | strip | matc | sourc |
|---|---|---|---|---|---|---|---|---|---|---|---|---|---|
| sample | 1 | george1 | 1 | 1 | sampl | 1 | georg | 1 | sampl | 1 | | | 1 |
| | | | | | | | | | | | georg | 2 | |

FIG. 6D

*Current UDR "Dictionary" record*

| browser_idc | panelist_id/member_id | string_type | string | match | source |
|---|---|---|---|---|---|
| Sample | sample | 1 | johnathan | 1 | 1 |
| Sample | sample | 2 | schmuckateli | 1 | 1 |
| Sample | sample | 4 | m | 1 | 1 |
| Sample | sample | 5 | 1946 | 1 | 1 |

*Record collected through transaction or UDR Form Data*

| browser_idc | string_type | string |
|---|---|---|
| sample | 1 | john |

*Values in the pseudonym lookup table for "john"*

| Name | Nickname |
|---|---|
| John | Jon |
| John | Johnny |
| John | Jonny |
| Johnathan | John |
| Johnathan | Johnny |

*Name-pseudonym match in UDR "Dictionary"*

| Name | Nickname |
|---|---|
| Johnathan | John |

| browser_idc | panelist_id/member_id | string_type | string | match | source |
|---|---|---|---|---|---|
| sample | sample | 1 | johnathan | 1 | 1 |
| sample | sample | 2 | schmuckateli | 1 | 1 |
| sample | sample | 4 | m | 1 | 1 |
| sample | sample | 5 | 1946 | 1 | 1 |

FIG. 6F

*Current UDR "Dictionary" record*

| browser_idc | panelist_id/member_id | string_type | string | match | source |
|---|---|---|---|---|---|
| sample | sample | 1 | johnathan | 1 | 1 |
| sample | sample | 2 | schmuckateli | 1 | 1 |
| sample | sample | 4 | m | 1 | 1 |
| sample | sample | 5 | 1946 | 1 | 1 |

*Collected transaction or UDR Form Data record [no match in the UDR "Dictionary"]*

| browser_idc | string_type | string |
|---|---|---|
| sample | 1 | michael |

FIG. 6G

| browser_idc | panelist_id/member_id | string_type | string | match | source |
|---|---|---|---|---|---|
| sample | sample | 1 | johnathan | 1 | 1 |
| sample | sample | 2 | schmuckateli | 1 | 1 |
| sample | sample | 4 | m | 1 | 1 |
| sample | sample | 5 | 1946 | 1 | 1 |
| sample | sample_1 | 1 | michael | 1 | 3 |
| sample | sample_1 | 4 | m | 1 | 3 |

FIG. 6H

*Current Marketscore/NetSetter Registration Database record:*

| panelist_id/member_id | first_name | last_name | email | birth_year | gender |
|---|---|---|---|---|---|
| sample | george | bush | elephant@whitehouse.com | 1946 | m |

*Normalized update to UDR "Dictionary" withOUT email prefix broken out:*

| panelist_id/member_id | string_id | string | type | match source |
|---|---|---|---|---|
| sample | 1 | george | | 1 |
| sample | 2 | bush | | 1 |
| sample | 3 | elephant@whitehouse.com | | 1 |
| sample | 4 | m | | 1 |
| sample | 5 | 1946 | | 1 |

*Normalized update to UDR "Dictionary" WITH email prefix broken out:*

| panelist_id/member_id | string_id | string | type | match source |
|---|---|---|---|---|
| sample | 1 | george | | 1 |
| sample | 2 | bush | | 1 |
| sample | 3 | elephant@whitehouse.com | | 1 |
| sample | 6 | elephant | | 1 |
| sample | 4 | m | | 1 |
| sample | 5 | 1946 | | 1 |

FIG. 6I

*Current UDR "Dictionary" record:*

| browser_idc | panelist_id/member_id | string_type | string | match | source |
|---|---|---|---|---|---|
| sample | sample | 1 | george | 1 | 1 |
| sample | sample | 2 | bush | 1 | 1 |
| sample | sample | 3 | elephant@whitehouse.com | 1 | 1 |
| sample | sample | 6 | elephant | 1 | 1 |
| sample | sample | 4 | m | 1 | 1 |
| sample | sample | 5 | 1946 | 1 | 1 |

*Transaction or UDR Form Data record collected [only information collected during site session]*

| browser_idc | string_type | string |
|---|---|---|
| sample | 3 | elephant@whitehouse.com |

*Transaction or UDR Form Data matched to our UDR "Dictionary"*

| browser_idc | panelist_id/member_id | string_type | string | match | source |
|---|---|---|---|---|---|
| sample | sample | 1 | george | 1 | 1 |
| sample | sample | 2 | bush | 1 | 1 |
| sample | sample | 3 | elephant@whitehouse.com | 2 | 1 |
| sample | sample | 6 | elephant | 1 | 1 |
| sample | sample | 4 | m | 1 | 1 |
| sample | sample | 5 | 1946 | 1 | 1 |

| browser_idc | string_type | string |
|---|---|---|
| sample | 3 | elephant@whitehouse.com |

Match counter increases by one

FIG. 6J

*Current UDR "Dictionary" record:*

| browser_idc | panelist_id/member_id | string_type | string | match | source |
|---|---|---|---|---|---|
| sample | sample | 1 | george | 1 | 1 |
| sample | sample | 2 | bush | 1 | 1 |
| sample | sample | 3 | elephant@whitehouse.com | 1 | 1 |
| sample | sample | 4 | m | 1 | 1 |
| sample | sample | 5 | 1946 | 1 | 1 |

*Transaction or UDR Form Data record collected [only information collected during site session]*

| browser_idc | string_type | string |
|---|---|---|
| sample | 3 | elephant@whitehouse.com |

*Transaction or UDR Form Data – email generates login/screen name*

| browser_idc | panelist_id/member_id | string_type | string | match | source |
|---|---|---|---|---|---|
| sample | sample | 1 | george | 1 | 1 |
| sample | sample | 2 | bush | 1 | 1 |
| sample | sample | 3 | elephant@whitehouse.com | 1 | 1 |
| sample | sample | 6 | elephant | 1 | 1 |
| sample | sample | 4 | m | 1 | 1 |
| sample | sample | 5 | 1946 | 1 | 1 |

New record created

| browser_idc | string_type | string |
|---|---|---|
| sample | 3 | elephant@whitehouse.com |

*One month later...another UDR Form Data record is collected with the following login/screen name*

| browser_idc | string_type | string |
|---|---|---|
| sample | 6 | elephant |

*UDR Form Data matched to our UDR "Dictionary"*

| browser_idc | panelist_id/member_id | string_type | string | match | source |
|---|---|---|---|---|---|
| sample | sample | 1 | george | 1 | 1 |
| sample | sample | 2 | bush | 1 | 1 |
| sample | sample | 3 | elephant@whitehouse.com | 1 | 1 |
| sample | sample | 6 | elephant | 1 | 1 |
| sample | sample | 4 | m | 1 | 1 |
| sample | sample | 5 | 1946 | 1 | 1 |

| browser_idc | string_type | string |
|---|---|---|
| sample | 4 | elephant |

FIG. 6K

*Current UDR "Dictionary" record:*

| browser_idc | panelist_id/member_id | string_type | string | match | source |
|---|---|---|---|---|---|
| Sample | sample | 1 | george | 1 | 1 |
| Sample | sample | 2 | bush | 1 | 1 |
| Sample | sample | 4 | m | 1 | 1 |
| Sample | sample | 5 | 1946 | 1 | 1 |

*Transaction or UDR Form Data record collected [only information collected during site session]*

| browser_idc | string_type | string |
|---|---|---|
| Sample | 3 | gwbush@whitehouse.com |

*The email prefix is parsed out into a first initial-last name sequence*

- First initial = "g"
- Last name found in UDR "Dictionary" = "bush"
- Last name matched against email prefix ["bush" found in "gwbush"]
- First initial-last name combination = gbush
- First initial searched in first names for last name "bush" = "g" for "george"

FIG. 6L

*Current UDR "Dictionary" record:*

| Browser_idc | panelist_id/member_id | string_type | string | match | source |
|---|---|---|---|---|---|
| Sample | sample | 1 | george | 1 | 1 |
| Sample | sample | 2 | bush | 1 | 1 |
| Sample | sample | 3 | gwbush@whitehouse.com | 1 | 1 |
| Sample | sample | 6 | gwbush | 1 | 1 |
| Sample | sample | 4 | m | 1 | 1 |
| Sample | sample | 5 | 1946 | 1 | 1 |

*UDR Form Data collected [only information collected during site session]*

| browser_idc | string_type | string |
|---|---|---|
| Sample | 4 | gwbush |

*Normalized update to UDR "Dictionary":*

| browser_idc | panelist_id/member_id | string_type | string | match | source |
|---|---|---|---|---|---|
| Sample | sample | 1 | george | 1 | 1 |
| Sample | sample | 2 | bush | 1 | 1 |
| Sample | sample | 3 | gwbush@whitehouse.com | 1 | 1 |

| sample | sample | 3 | gwbush@msn.com | 1 | 3 |
|---|---|---|---|---|---|
| Sample | sample | 6 | gwbush | 2 | 3 |
| Sample | sample | 4 | m | 1 | 1 |
| Sample | sample | 5 | 1946 | 1 | 1 |

FIG. 6M

*Current UDR "Dictionary" record:*

| browser_idc | panelist_id/member_id | string_type | string | match | source |
|---|---|---|---|---|---|
| Sample | Sample | 1 | george | 1 | 1 |
| Sample | Sample | 2 | bush | 1 | 1 |
| Sample | Sample | 3 | elephant@whitehouse.com | 1 | 1 |
| Sample | Sample | 6 | elephant | 1 | 1 |
| Sample | Sample | 4 | m | 1 | 1 |
| Sample | Sample | 5 | 1946 | 1 | 1 |

*UDR Form Data collected [only information collected during site session]*

| browser_idc | string_type | string |
|---|---|---|
| sample | 4 | elephant |

*UDR Form Data matched to our UDR "Dictionary"*

| browser_idc | panelist_id/member_id | string_type | string | match | source |
|---|---|---|---|---|---|
| sample | Sample | 1 | george | 1 | 1 |
| sample | Sample | 2 | bush | 1 | 1 |
| sample | Sample | 3 | elephant@whitehouse.com | 1 | 1 |
| sample | Sample | 6 | elephant | 1 | 3 |
| sample | Sample | 4 | m | 1 | 1 |
| sample | Sample | 5 | 1946 | 1 | 1 |

FIG. 6N

*Current UDR "Dictionary" record:*

| browser_idc | panelist_id/member_id | string_type | string | match | source |
|---|---|---|---|---|---|
| sample | sample | 1 | george | 1 | 1 |
| sample | sample | 2 | bush | 1 | 1 |
| sample | sample | 3 | elephant@whitehouse.com | 1 | 1 |
| sample | sample | 6 | elephant | 1 | 3 |
| sample | sample | 4 | m | 1 | 1 |
| sample | sample | 5 | 1946 | 1 | 1 |

*UDR Form Data collected [only information collected during site session]*

| browser_idc | string_type | string |
|---|---|---|
| sample | 6 | gwbush |

*First Initial-Last Name logic implemented based on login/screen name*

- First initial = "g"
- Last name from "Dictionary" = "bush"
- Last name matches partial login/screen name string: "bush" = "gwbush"
- First initial, "g" searches against members with "bush": "g" = "george"

*UDR Form Data matched to our UDR "Dictionary"*

| browser_idc | panelist_id/member_id | string_type | string | match | source |
|---|---|---|---|---|---|
| sample | sample | 1 | george | 1 | 1 |
| sample | sample | 2 | bush | 1 | 1 |
| sample | sample | 3 | elephant@whitehouse.com | 1 | 1 |
| sample | sample | 3 | gwbush@hotmail.com | 1 | 3 |
| sample | sample | 6 | elephant | 1 | 3 |
| sample | sample | 6 | gwbush | 1 | 3 |
| sample | sample | 4 | m | 1 | 1 |
| sample | sample | 5 | 1946 | 1 | 1 |

FIG. 6O

*Current UDR "Dictionary" record:*

| browser_idc | panelist_id/member_id | string_type | string | match | source |
|---|---|---|---|---|---|
| Sample | Sample | 1 | george | 1 | 1 |
| Sample | Sample | 2 | bush | 1 | 1 |
| Sample | Sample | 3 | gwbush@whitehouse.com | 1 | 1 |
| Sample | Sample | 6 | gwbush | 1 | 3 |
| Sample | Sample | 4 | m | 1 | 1 |
| Sample | Sample | 5 | 1946 | 1 | 1 |

*UDR Form Data collected within the same url record*

| browser_idc | string_type | string |
|---|---|---|
| Sample | 1 | george |
| Sample | 4 | M |

*UDR Form Data matched to our UDR "Dictionary"*

| browser_idc | panelist_id/member_id | string_type | string | match | source |
|---|---|---|---|---|---|
| Sample | Sample | 1 | george | 2 | 1 |
| Sample | Sample | 2 | bush | 1 | 1 |
| Sample | Sample | 3 | gwbush@whitehouse.com | 1 | 1 |
| Sample | Sample | 6 | gwbush | 1 | 3 |
| Sample | Sample | 4 | m | 2 | 1 |
| Sample | Sample | 5 | 1946 | 1 | 1 |

*Current UDR "Dictionary" record:*

| browser_idc | panelist_id/member_id | string_type | string | match | source |
|---|---|---|---|---|---|
| Sample | Sample | 1 | terry | 1 | 1 |
| Sample | Sample | 2 | bush | 1 | 1 |
| Sample | Sample | 3 | tbush@whitehouse.com | 1 | 1 |
| Sample | Sample | 6 | tbush | 1 | 3 |
| Sample | Sample | 5 | 1946 | 1 | 1 |

*UDR Form Data collected within the same url record*

| browser_idc | string_type | string |
|---|---|---|
| sample | 1 | terry |
| Sample | 4 | M |

*UDR Form Data matched to our UDR "Dictionary"*

| browser_idc | panelist_id/member_id | string_type | string | match | source |
|---|---|---|---|---|---|
| Sample | sample | 1 | terry | 2 | 1 |
| Sample | sample | 2 | bush | 1 | 1 |
| Sample | sample | 3 | tbush@whitehouse.com | 1 | 1 |
| Sample | sample | 6 | tbush | 1 | 3 |
| Sample | sample | 4 | m | 1 | 3 |
| Sample | sample | 5 | 1946 | 1 | 1 |

FIG. 6P

*Current UDR "Dictionary" record:*

| browser_idc | panelist_id/member_id | string_type | string | match | source |
|---|---|---|---|---|---|
| Sample | sample | 1 | george | 1 | 1 |
| Sample | sample | 2 | bush | 1 | 1 |
| Sample | sample | 3 | gwbush@whitehouse.com | 1 | 1 |
| Sample | sample | 6 | gwbush | 1 | 3 |
| Sample | sample | 4 | M | 1 | 1 |
| Sample | sample | 5 | 1946 | 1 | 1 |
| Sample | sample_1 | 1 | William | 1 | 1 |
| Sample | sample_1 | 2 | Clinton | 1 | 1 |
| Sample | sample_1 | 3 | wjclintion@whitehouse.com | 1 | 1 |
| Sample | sample_1 | 6 | wjclinton | 1 | 1 |
| Sample | sample_1 | 4 | M | 1 | 1 |
| Sample | sample_1 | 5 | 1946 | 1 | 1 |

*UDR Form Data collected [only information collected within the session]*

| browser_idc | string_type | string |
|---|---|---|
| sample | 4 | M |

FIG. 6Q

SYSTEMS FOR AND METHODS OF USER DEMOGRAPHIC REPORTING USABLE FOR IDENTIFIYING USERS AND COLLECTING USAGE DATA

CROSS-REFERENCE TO RELATED APPLICATIONS

This application is a continuation application of and claims priority to U.S. application Ser. No. 13/078,667, filed Apr. 1, 2011, now allowed, which is a continuation of U.S. application Ser. No. 10/358,377, filed on Feb. 5, 2003, now U.S. Pat. No. 7,930,285, which is a continuation-in-part of U.S. application Ser. No. 09/532,890, filed on Mar. 22, 2000, now U.S. Pat. No. 7,181,412. U.S. application Ser. No. 10/358,377 also claims the benefit of U.S. Provisional Application Nos. 60/353,993, filed on Feb. 5, 2002, and 60/355,785, filed on Feb. 12, 2002, the entirety of each being herein incorporated by reference.

BACKGROUND OF THE INVENTION

1) Field of the Invention

The present invention relates to systems and methods useful in identifying a computer user and the user's demographic and other user specific information from his or her activities on the computer, particularly from the user's activities on a network, as well as differentiating between user requested data and automatically generated data.

2) Brief Description of the Related Art

Knowing the actual identity of a computer user can be invaluable tier many reasons. As explained herein below, when a user accesses the Internet, for example, identification information relating to the computer or the software may be available over the network, and user input information, such as a login name, might be available at times. However, this information may not identify the actual user and user identification does not always accompany requests for webpages, and the like. Even when user identification information is provided in a communication, such as when using AOL and CompuServe, this information is generally limited to a user's e-mail address or a user name, rather than an actual name or user's identity. Sometimes a user-defined profile is available as well. However, this limited information is not available and does not often provide enough useful information about the user, particularly when the user may have multiple accounts each with their own distinct user-defined profile, for instance. It is particularly disadvantageous when trying to derive user demographic information for market research.

The granularity of market research largely depends on the accuracy of the consumer demographics being reported with the consumer's market activities.

Consumer decision-making has been a focus for many years. Companies that are attempting to meet a particular need in the marketplace, or that are attempting to find out how products or services are being received by the consumer, will often conduct market research to attempt to quantify attributes or characteristics of a particular consumer segment. If performed well, the data extracted from this research can inform companies about how their and others' products or services are perceived and bought by purchasers or potential purchasers in the marketplace, and how the companies' products or services can be changed to achieve the companies' business goals.

Traditionally, this information is segregated into demographic categories, such as age, gender, martial status, income bracket, education level, etc. A problem common to general protocols for performing consumer-oriented market research is collating consumers' activities and spending habits to the consumers' demographic profiles. Surveys, whether in person, by mail or the Internet, usually include inquiries about a person's relevant demographic information when inquiring about the person's buying habits and/or the market research information. However, for Internet-activity monitoring, the process of asking the user to provide this information is cumbersome.

Internet-activity monitoring includes a server-side consumer data collection strategy in which an individual Internet content provider ("website") monitors and collects data about each consumer who has requested data from ("visited") the website, and then compiles this data about all the consumers who have visited that website.

Alternatively, or additionally, data collection directly from an Internet consumer's computer has also been proposed, i.e., client-side data collection. Such systems commonly involve installing a software application onto the consumer's computer, which operates at the same time as Internet browser application software. The software then collects data about the consumer's Internet usage, e.g., which websites the consumer has visited. The data is then uploaded to a data-collecting computer on the Internet.

Yet another strategy is to have the user's Internet-activity pass through an intermediary domain having server or servers which monitor all of a users activities by tracking and filtering the requests and replies between the user and content providing servers and proxy servers, as detailed in U.S. patent application Ser. No. 09/532,890, filed Mar. 22, 2000, herein incorporated by reference.

A challenge for each of server-side, client side and intermediary server-side systems is to collect and relate data about the consumer, such as age, income level, marital status, and other demographic, economic, and personal information to the user's activities, which would allow the data to be compared with consumer databases from other sources, without noticeably affecting the user's experience.

SUMMARY OF THE INVENTION

According to a first exemplary implementation, a method of collecting data relating to a user's usage, including transactions, over a network typically includes the user utilizing a computing device to send and receive data sets over the network, the computing device having an address on the network, the data sets including data representative of the address of the computing device on the network, comprising: directing all data sets from the computing device to a known domain; assigning a unique identifier to the computing device using a data field in an HTTP request header; readdressing data sets sent from the computing device to indicate that the data sets originated in the known domain; recording at least part of the data sets; and sending the readdressed data onto the network.

According to a second exemplary implementation, a method the user is identified from a group of users by either or both her keystroke dynamics or by monitoring for keywords upon which a user demographic dictionary is built.

According to a third exemplary implementation, a method wherein user requested content is differentiated from automatically generated or server side directed content.

Still other features, and attendant advantages of the present invention will become apparent to those skilled in the art from a reading of the following detailed description of implementations constructed in accordance therewith, taken in conjunction with the accompanying drawings.

BRIEF DESCRIPTION OF THE DRAWINGS

The invention of the present application will now be described in more detail with reference to preferred implementations of the apparatus and method, given only by way of example, and with reference to the accompanying drawings.

DETAILED DESCRIPTION

Figure 1:
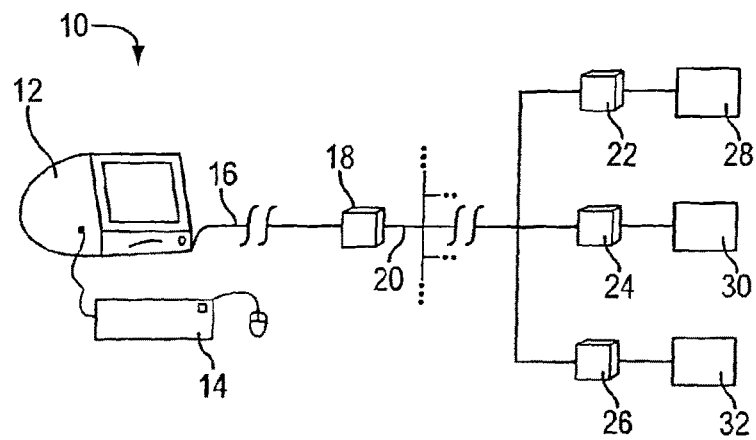
FIG. 1 schematically illustrates a prior network configuration.

Referring to the drawing figures, like reference numerals designate identical or corresponding elements throughout the several figures.
1) Exemplary System Configuration The present invention relates inter alia to systems and methods useful for collecting data indicative or representative of a specific Internet user's activity. An intermediary domain is established with proxy servers and data servers to which all of a single Internet user's activity is routed, which enables all of the activity to be filtered and data to be collected about specific types of activity and stored on the data servers. The intermediary domain is established on the Internet for example, and by simply instructing the user's Internet browser to route all Internet traffic from the user through the intermediary domain, the intermediary domain can perform whatever data collection is desired without incurring perceptible delays in webpage retrieval and the like. Enrollment in the system may be voluntary on the part of the individual Internet user, and the enrolled Internet user would be provided some incentive in return for allowing the system to have all of that user's Internet traffic routed through the system's domain. Furthermore, specific information about the Internet user could be gathered as a prerequisite for enrollment, which enriches the data collected about that user's Internet usage habits and permits inter-database comparisons.

Systems of the present invention allow server-side data collection at a single domain. All of the Internet traffic of a single Internet user is monitored. Therefore, for a single user, data can be collected indicative of usage of all sites while maintaining data integrity and completeness. Different from client-side systems, the intermediary systems and methods demand less computing resources, and fewer resources for a customer service center. Furthermore, when websites change the formats of their webpages, only the data resident in intermediary domain need be updated, which can dramatically reduce costs.

Throughout the present application, an understanding of the use and function of general purpose computing devices, including what have come to be referred to as "personal computers" ("PC"), is assumed, as those of ordinary skill in the art are skilled in their use and function. Furthermore, an understanding of the use and function of commercially available operating systems which control some of the functions of general purpose computing devices, as well as with commercially available application software such as Netscape® Navigator® (Netscape Communications Corp., Mountain View, Calif.; http://www.netscape.com), Microsoft® Internet Explorer® (Microsoft Corp., Redmond, Wash.; http://www.microsoft.com), and proxy server application software, is assumed. Throughout the present application, a natural person who uses a computer is referred to as a "user" or a "consumer".

FIG. 1 illustrates a prior network configuration 10 over which a consumer is able to retrieve data and information, and send data and information, for a number of purposes. For purposes of this application, a PC should be broadly interpreted to encompass any device capable of communication over the Internet via a browser, including general purpose computers, Internet ready telephones and other wireless communication devices, Internet enabled TV's and auxiliary devices, etc. The configuration 10 includes a PC 12, which is in communication, either wired or wireless, with data input elements 14 such as a keyboard and pointing device. The PC 12 includes appropriate communications hardware and volatile and non-volatile memory elements (not illustrated) in or on which are stored an operating system and application software which allow a user to send and receive data, and to present that data in a form which is understandable to the user. Such software includes application software commonly referred to as a "browser", such as Netscape, Internet Explorer and AOL. The PC 12 can also function as a local, internal proxy server.

The PC 12 is connected to a wired or wireless communications line 16 which is connected to a computer or computing device 18. The computer 18 can be a general purpose computer which includes application software which controls the computer to function as a data server, and which is usually remote from the PC 12. The computer 18, or its owner, can be an "Internet server provider" ("ISP"), for which line 16 includes telephone, coaxial cable, or similar links between the PC 12 and the computer 18. The computer 18 can also be located on a private network, e.g., a local area network or LAN, and includes application software controlling the computer 18 to function at least as a firewall, proxy server, or both.

The computer 18 is connected to what is commonly referred to as the World Wide Web or the Internet (together "WWW", not illustrated) through a communications line 20. FIG. 1 presents a very simple representation of the WWW, which is much more distributed than is illustrated in FIG. 1. Also in communication with the WWW are a plurality (only three are illustrated) of content data servers 22, 24, 26, (i.e., in the language of the WWW, websites), which have stored therein data or information 28, 30, 32, (e.g., webpages) respectively.

Technically, what distinguishes the Internet is its use of a set of protocols called TCP/IP (Transmission Control Protocol/Internet Protocol). Two recent adaptations of Internet technology, the intranet and the extranet, also make use of the TCP/IP protocol. When a person or organization has a computer connected to the public portion of the Internet, the computer is assigned an Internet Protocol (IP) address, which uniquely identifies that computer. Typically, however, the computer is assigned a set of addresses at a certain class level (A, B, C, etc.), and all of the addresses within that set are routed to that computer, if that computer is a proxy server (see discussion below) for a private network of computers, then each of the computers within the private network can be assigned a unique IP address in the set assigned to the proxy server. Thus, the computers assigned IP addresses within the set define an "intranet", because the IP addresses are all within the address set assigned to the proxy server. The most widely used part of the Internet is the World Wide Web (often called "the Web"). Its outstanding feature is hypertext, a method of instant cross-referencing.

In an enterprise that uses the Internet, a proxy server is a server that acts as an intermediary between a workstation user and the Internet so that the enterprise can ensure security, administrative control, and caching service. A proxy server is associated with or part of a gateway server that separates the enterprise network from the outside network and a firewall server that protects the enterprise network from outside intrusion. A proxy server receives a request for an Internet service (such as a Web page request) from a user. If it passes filtering requirements, the proxy server, assuming it is also a cache server, looks in its local cache of previously downloaded Web pages. If it finds the page, it returns it to the user without needing to forward the request to the Internet. If the page is not in the cache, the proxy server, acting as a client on behalf of the user, uses one of its own IP addresses to request the page from the server out on the Internet. When the page is returned, the proxy server relates it to the original request and forwards it on to the user.

To the user, the proxy server is invisible; all Internet requests and returned responses appear to be directly with the addressed Internet server. (The proxy is not quite invisible; its IP address has to be specified as a configuration option to the browser or other protocol program.) An advantage of a proxy server is that its cache can serve users. If one or more Internet sites are frequently requested, these are likely to be in the proxy's cache, which will improve user response time. In fact, there are special servers called cache servers. A proxy can also do logging. The functions of proxy, firewall, and caching can be in separate seer programs or combined in a single package. Different server programs can be in different computers. For example, a proxy server may be in the same machine with a firewall server or it may be on a separate server and forward requests through the firewall.

Thus, requests for data from one computer to another computer within the same assigned set of IP addresses are considered secure, because the request and the data sent in reply do not get passed to any computer not assigned an IP address within the set. When a request for data is addressed to a computer not within the set of IP addresses, the request must pass to computers which are assigned IP addresses not within the set assigned to the same person or entity, and are therefore considered insecure. This latter insecure request for data passes over the Internet, because it is passed to computers with IP addresses not in the same assigned set as the originating computer.

Functionally, when a consumer using a PC 12 wants to retrieve data (e.g., a webpage) from a website on the WWW, the user utilizes the application software on the PC 12 to be assigned an Internet protocol (IP) address (including a classless interdomain routing, CIDR, address), i.e., to open a connection to the WWW. The user then launches and uses the browser software to request data from a specified machine, such as a server 22 on the WWW, by entering the uniform resource locator (URL) designation for the machine, and preferably the specific data file on that machine, such as data 28. The data representing this request for data is communicated to the computer 18, which processes the request data to be sent out onto the WWW, typically in the form of multiple data packets, including the IP address for the PC 12.

The servers 22, 24, or 26 usually are not directly connected to computer 18, and each data packet can take a different route from computer 18 to server 22. Upon being communicated to server 22, each packet is reassembled with the other packets to reconstruct the original data request from the user. The server 22 then retrieves data 28, and processes the data for the return trip across the WWW to the user's PC 12, typically in the same manner as the user's data request. The browser software running on the PC 12 then reassembles the data packets to reconstruct data 28, and presents it to the user in a particular, usually an understandable form, and can be either static or dynamic, i.e., can itself include instructions for controlling the PC 12. For example, data 28 can include software instructions, such as instructions scripted in Java™ (Sun Microsystems, Inc., Palo Alto, Calif.; http://www.javasoft.com) which are executed on the PC 12.

Thus, when a consumer using the PC 12 wants to place an order for a product or service that is offered through a merchant using server 22 on the WWW, the user requests a particular data file 28 from the server 22. The data file 28 oftentimes includes data that results in a form being generated by the PC 12 and displayed to the user. The user enters information into the form using the keyboard 14, and sends the filled-out form back to the server 22, including data representing what the user would like to buy, and payment information, such as credit card information.

Figure 2:
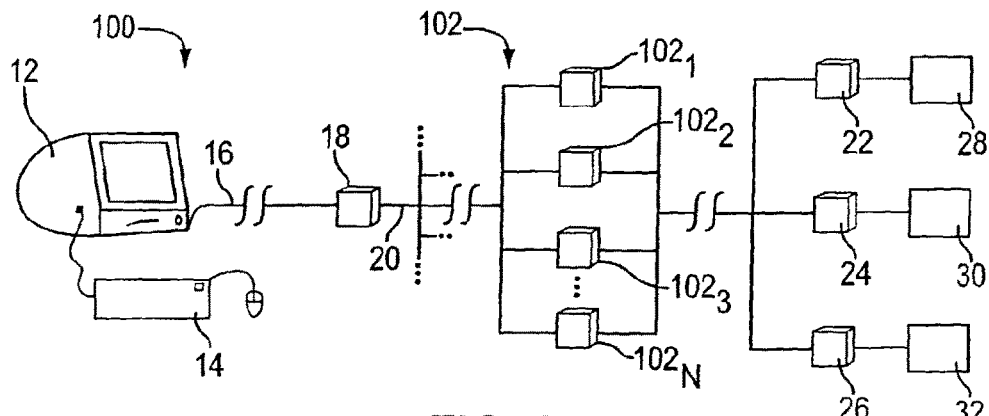
FIG. 2 schematically illustrates an exemplary implementation of a system.

FIG. 2 schematically illustrates an exemplary system 100 in accordance with one implementation of the present invention. For purposes of brevity, individual elements included in the system 100, which have been described above with reference to FIG. 1 will not be described further. The system 100 includes an intermediary domain 102, e.g., a domain on a network, which includes one or more computers and associated hardware, firmware, and software, which together function as a domain on the WWW. In general, the intermediary domain 102 is operatively in the path between the PC 12 (and the computer 18) and all other machines on the WWW, so that all of the data that is sent to and from the PC 12 is routed through the intermediary domain 102. As schematically illustrated in FIG. 2, however, the intermediary domain 102 is on the public (WWW) side of the computer 18, and is therefore not necessarily in direct communication with either computer 18 or any of servers 22, 24, 26.

The intermediary domain 102 includes at least one, and preferably a plurality of machines $102_X$, each with associated hardware, firmware, and software as discussed above. Each machine $102_X$ (X [1, N], wherein N is a positive integer) has a unique IP address within the intermediary domain 102, and therefore can be located together or distributed throughout the WWW.

Figure 3:
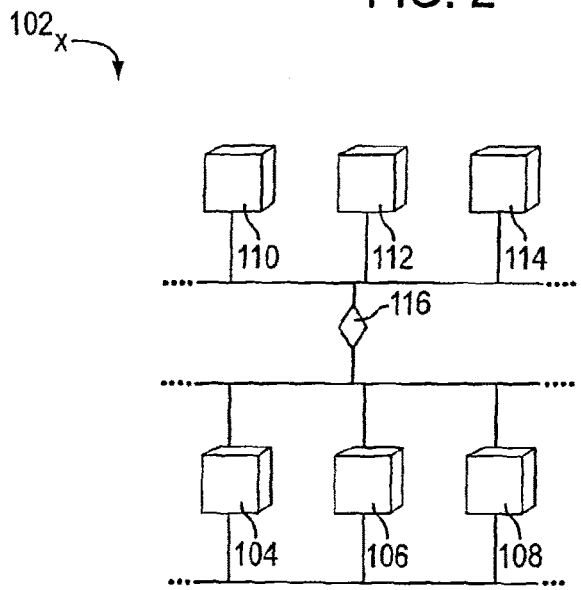
FIG. 3 schematically illustrates a portion of the system illustrated in FIG. 2.

FIG. 3 schematically illustrates an exemplary implementation of a configuration of the intermediary domain 102. The intermediary domain 102 includes at least one, and preferably numerous (only three are illustrated) proxy servers 104, 106, 108, and at least one, and preferably numerous (only three are illustrated) data servers 110, 112, 114, which are in communication with the proxy servers. For example, the data servers 110, 112, 114 can be Structured Query Language (SQL) servers. The proxy servers 104, 106, 108 include proxy server application software which allow the PC 12 to route requests for data through the intermediary domain 102. The PC 12 is therefore aliased within the intermediary domain 102, which requires all of the data which is sent from the PC 12 onto the WWW and all of the data from the WWW which is intended for the PC 12 to be copied, processed as by a filter 116, and stored within the intermediary domain 102 on data servers 110, 112, 114. Thus, a complete copy of all data addressed for the PC 12 is copied within the intermediary domain 102, and is filtered. The filter 116 can be constructed to retain all of the data, or to retain portions of the data in servers 110, 112, and 114.

Thus, when machines such as servers 22, 24, and 26 on the WWW receive data from the PC 12, because it has been routed through the intermediary domain 102 and readdressed with an IP address within the intermediary domain 102, data sent by a server 22 which was requested by the user of the PC 12 is addressed to the Internet user "in care of" the intermediary domain 102. A proxy server 104 receives data 28 from the server 22, readdresses the data to the PC 12 based on an unique identifier (see below) at the IP address assigned (either statically or dynamically) to the PC 12, and transmits the readdressed data 28 back into the WWW. Data 28 is then collected by the gateway server 18, and transmitted to the PC 12, as discussed above. Importantly, the intermediary domain 102 is not an ISP or proxy server gateway from a private network. The intermediary domain 102 is another domain on the WWW through which consumer/PC-specific data is routed, and includes a proxy server gateway onto the public WWW network. According to some implementations, the intermediary domain 102 is an ISP to which the PC 12 directly connects, i.e., includes computer 18.

2) Collecting Market Research Data

Figure 4:
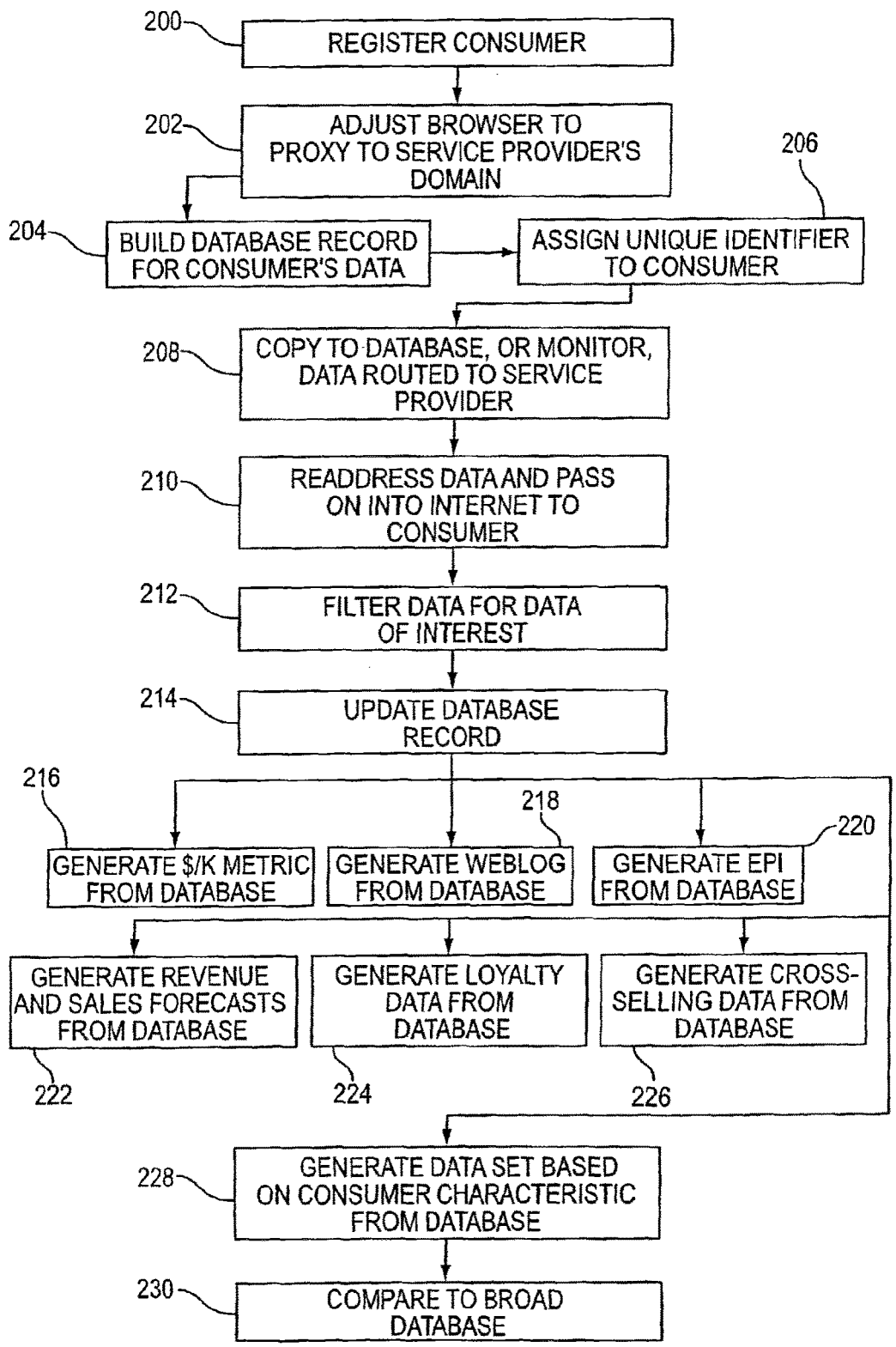
FIGS. 4, 4A, 4B and 5 diagrammatically illustrate flowcharts of steps of methods, as further described below.

The present invention also relates to methods of collecting data about computer user habits, preferences, uses, and the like, and methods of using this data. Other systems can be used without departing from the spirit and scope of the present invention. FIG. 4 diagrammatically illustrates a flow chart of steps of methods in accordance with the following description.

As discussed above, data representative of Internet consumers' individual identity (rather than the computer's), the consumer's behavior, including (but not exclusively) what choices the consumer makes, why particular characteristics of a product or service are important, what products or services a consumer has considered and decides not to purchase, and how much money a consumer is willing to pay and has paid for a product or service, can be a valuable product in itself. The quality of the data, e.g., statistical significance and error, greatly impacts how valuable the data is to a party wanting to know about a particular consumer's habits.

Methods in accordance with the present invention collect and generate data which is extremely complete for an individual user, and therefore can be very useful by itself or when correlated with other data about that user, or other consumers that share characteristics with the user. Furthermore, in implementations of the present invention that do not rely on client-side data collection, but instead utilize server-side data collection, the impact on the performance of the individual consumer's PC 12 is minimal, and does not require repeated software updating as with prior systems which were resident on the PC 12.

Initially, an Internet consumer is registered so that the consumer's PC 12 can be uniquely identified (Step 200) in an exemplary system. To encourage consumers to participate in the monitoring activity, incentives may be offered to the consumer in exchange for routing all of that consumer's Internet data so that it can be monitored. The exact nature of the compensation can vary, and can include money, products, services and the like. Additionally or alternatively, the compensation can be in the form of faster Internet access or other value-added services to the consumer. For example, when using system 100 described above, data can be delivered to the PC 12 in compressed form from the intermediary domain 102. Because of the decrease in required bandwidth required for transmitting compressed data, the consumer experiences an overall increase in data transfer rates between the intermediary domain 102 and PC 12, even when factoring in decompression of the data by computer 12. Thus, the retransmission of compressed data can be an incentive for the Internet consumer to agree to proxy all of their Internet data through the intermediary domain 102.

Commercially available browser software, such as Navigator® and Internet Explorer®, include decompression software which can be configured to automatically decompress compressed data upon receipt by the PC 12. Thus, according to one implementation of the present invention, the intermediary domain 102 compresses data to be sent to the PC 12, resulting in faster net times between the PC requesting data and that data being delivered to the PC 12. By way of example and not of limitation, the intermediary domain 102 can include a set of logical instructions, e.g., software, which compresses data according to a known compression routine, e.g., the Gzip compression routine. As the browser software running on the PC 12 can both recognize and decompress Gzip compressed data, the Internet consumer receives the benefit of faster net data transmission without the need to intervene in the process of decompressing the data with a separate decompression application or tool. The particular compression protocol used to compress and decompress the data can be any of the numerous known data compression protocols, such a "zip", "uuencode", "tar", "lzh", "MIME", "ARC", "Binhex", "sit", "hqx", etc., within the spirit and scope of the present invention, the protocol being selected so that the browser application running on the PC 12 includes logic to automatically decompress data which has been compressed according to that algorithm.

Additionally, or alternatively, virus screening, elimination of pop-up, pop-under and other forms of unsolicited advertisements, parental controls, e-mail virus screening, firewall protections can be offered and in some instances, offered such that the level and combination of services are selected by the user.

Also by way of example, the intermediary domain 102 can perform proxy caching, including hierarchical caching, of webpages and entire websites of predetermined interest. Thus, when a consumer requests a webpage which has been cached in the intermediary domain 102, the data is served to the consumer much faster than if an original copy of the requested webpage were requested and passed through to the consumer.

Of course, the decision to participate, i.e., to contract with the service provider, is voluntary, and some consumers may elect not to participate. Those who choose to participate supply the service provider with information about themselves; the exact data can vary, and could include demographic, socio-economic, geographic, and any other information commonly collected in market research studies. Such information can include, but is not limited to user age, user income level, user education level, household size, time of transmission of the data set, location of computing device, date of transmission of the data set, currency paid, type of product purchased, type of service purchased, network address of the intended recipient of a data set, click-through address, banner advertisement impression, and permission e-mail received, and combinations thereof.

Furthermore, the consumer is provided with a small application software applet which adjusts the browser application running on the consumer's computer so that it proxies to the service provider's proxy server, i.e., so that it redirects all of the consumer's outbound data to the intermediary domain 102. If the service provider is utilizing system 100, described above, the applet will reset the browser to proxy to the intermediary domain 102. Publicly available browsers are provided with the ability to do this "reset" operation. The applet can be directly downloaded, shipped via a diskette, CD-ROM, or the like, or manually installed or modified by a technician who visits the consumer (Step 202).

A database record is built based on the data set supplied by the consumer (Step 204). A unique identifier is assigned to the consumer (Step 206).

2a) Exemplary Unique Browser Identification Information

Because each PC 12 can be dynamically assigned an IP address by the computer 18, the intermediary domain 102 must first be provided with unique identifying information about the PC 12 to differentiate it from other computers which are similarly proxied through the intermediary domain 102. This information may be identifying information provided by a component (either software or hardware) of PC 12, such as by a "cookie" returned to the intermediary domain 102, a "digital certificate" returned to the intermediary domain 102, CPU chip identifying information (as has recently been commercially available in Pentium® III class chips from Intel Corp., Santa Clara, Calif.; http://www.intel.com), or other unique identifying information.

In one implementation of the present invention, identifying information or data can be included in each data packet, such as in the header portion of each packet, so that each packet uniquely identifies each the PC 12 from which it originated. By way of example and not of limitation, one or more fields in the packet header can include unique identifying information. Changing the value that is contained in any particular field of a packet header to include such identifying information is contemplated. Again by way of example and not of limitation, the language field value, for example, can be changed so that it is, or includes in addition to a language code, a unique identifier such as an alphanumeric string, or more than one alphanumeric string, after one or more language codes which preserves the function of the language tag. The alphanumeric strings can also be used to encode information, including demographic or other user specific information about the user, or users of the browser, to make data collection and processing simpler. This change in the data field, for example, can be readily achieved by changing the browser's preferences to include the unique identifier, which can be performed manually through the application tools provided with the browser. Alternatively, this change can be achieved by executing a series of logical instructions, as embodied in software, on the PC 12, either distributed via a disc or other memory device or downloaded over the network. Further, initiation routines in the browser software can reset the data field to include this identification information at each software initiated. Any other field in a packet header can be used instead of, or in addition to, the language field.

In summary, this mechanism of branding the browser with a unique identification is carried out through a method including the following steps. This method of identifying a computer device or the PC 12 on a network 10, 100 includes the steps of establishing a connection between the PC 12 and the network. While of course this can involve connecting the PC 12 to the Internet, for example, it could additionally or alternatively involve connecting to any other public or private network using data formats that include header fields. A computer, such as a data server on a network, can provide instructions to the PC 12 to alter a data field in the header portion of a communications protocol in a browser program on the computing device to include identification data unique to the computing device on the network. Alternatively, these instructions can be disseminated through computer readable, tangible media such as magnetic or optical disks, or any suitable storage media, or can be followed by a user to configure the computing device or PC.

The method also includes transmitting the data field from the PC 12 over the network with requests for data and parsing the data field to extract the identification data in the modified data field. The computing device or PC 12 is then identified from the extracted identification data. This identification can take place at the intermediary domain 102 or at other content servers 22, 24, 26. It can take place at a gateway server 18 within the enterprise, or even on the PC 12, if desirable.

Additionally, the modified data strings added to a header data field could be used to encode information, such as to separate groups of users in a panel of monitored users for market research purposes or to encode specific user identification or demographic information, for instance. For example, in a household that might have multiple users on a single machine, the first and/or second halves of a computer identification code could be used to identify each user's or potential user's age, income bracket and other identifying demographic information, perhaps without specifically identifying the individuals.

2b) User Identification from User Mannerisms in Input Device Activities

A specific user can be identified from a set of possible users by employing the characteristics of the user's input device activities, i.e., either his keystrokes or his mouse clicks. Identifiable characteristics of the user's input activities, such as the dwell time on the keys, the time between keystrokes, patterns and/or vectors derived through key combinations can be used to uniquely identify a single user because of that particular user's mannerisms in using the input device. For instance, key combinations can include two or three letter digraphs (e.g., "ea", "ht", "tp", double clicking, etc.) or trigraphs. The technique of user authentication through monitoring keystroke dynamics has been structured. See, Monrose and Rubin, "Authentication via Keystroke Dynamics," Proceedings of the ACM Conference on Computer and Communications Security, pp. 48-56, Apr. 1-4, 1997, Zurich, Switzerland; Gramacy and McKenna, "User Authentication Using Keystroke Dynamics," CS290x F2001, Security and Cryptography Final Project; U.S. Pat. No. 4,621,334 to Garcia and U.S. Pat. No. 4,805,222 to Young et al., each of these articles and patents being herein incorporated by reference. These documents explore using these techniques to determine user identity at an initial access to privileged resources, and indicate that the performance can be problematic because the input of login names and passwords may not provide enough information to accurately identify users based on habitual patterns in their ping rhythm. The present invention overcomes these problems by not only developing statistical models of the habitual patterns for purposes of comparison to fresh inputs from a user to determine identity, but also to develop statistical models during individual online sessions, for instance. In this way, at an initial stage, the input device dynamics may indicate with 70% certainty that the user is a particular member of a family. As the session progresses, the statistical data becomes more refined leading to a statistical probability of identification approaching unity, i.e., 100%.

As will be appreciated, particularly when dealing with a preset number of potential users, e.g., father, mother, daughter and son, the analysis of the input device dynamics can assist in identifying a user name for instance, as belonging to a given member of a family. Also, if a group member is using a browser under a user name normally associated with another group member, then this can be determined and the collected data attributed to the correct person in the group.

The input device patterns can be quantified in any number of ways, such as those articulated in the above-cited articles, including measuring the timing between keystrokes and clicks, common typing errors, such as habitually typing "teh" for "the", etc., and/or combinations of these measure characteristics.

For example, vectors can be determined based on the timing between input device entries and statistically processed.

In this way, the user's usage can be tied to an actual user, rather than just the identity of the machine or logon identification. Further, it is entirely possible that a single user would have multiple screen names or multiple users can use the same screen name. This user identification from the input device activities helps differentiate the users without requiring additional interaction with the user to thereby provide more accurate information and allow action of Internet activities. Additionally, if the input device dynamics does not match any of the known users of a household for instance, then the usage can be allocated to a guest or generally an unknown user.

The input device dynamics can also be implemented to identify traits to early distinguish users. Some users may be early distinguished, e.g., between a slow typing user and a fast typing user, and the processing shortened to look for this one trait thereby avoiding further processing when that trait serves the purpose of the invention.

Figures 4A, 6:
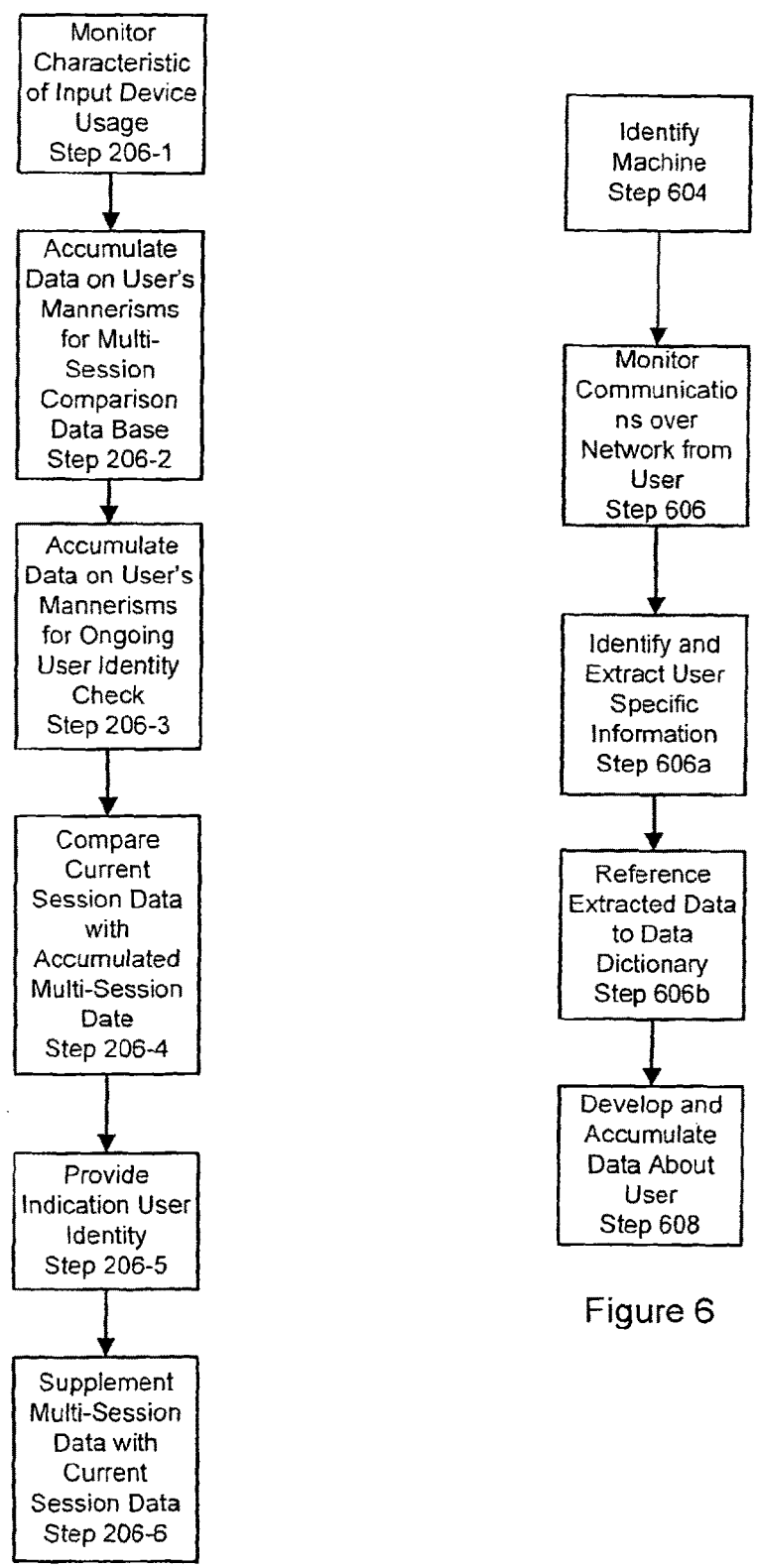
FIGS. 6 and 6A-6Q illustrate a user demographic reporter, as further described below.

In light of the above, the present invention involves a method of identifying a user of a computer device or PC 12 having at least one input device 14. The computer device can be connected to a network. The method includes the step of, as shown in FIG. 4A, monitoring at least one characteristic of input device operation by a user to provide data on at least one mannerism of the user in operating the input device (Step 206-1). This can be done in the PC 12, or on the network at another location such as the intermediary domain 102 by, for instance, transmitting from the PC 12 to the intermediary domain 102 an indication of the keystrokes or clicks against a time line or simply annotating the keystrokes with relative timing, for instance. The time vectors between keystrokes can be calculated in real time on the PC 12 through the use of suitable software.

The data on the mannerism or mannerisms of the user in operating the input device are accumulated to provide accumulated mannerism data for a given session, as shown in Step 206-3 of FIG. 4A. At some point, either in real time or later, the accumulated mannerism data are compared (at Step 206-4) to a database of mannerisms of at least one user over multiple sessions or in a "training" session when a user is asked to type in certain keystroke combinations, for instance, (in Step 206-2) to provide a comparison result, as shown in FIG. 4A. Then, an indication of an identity of a user can be provided using the input device of the computer based on said comparison result, as shown in Step 206-5 of FIG. 4A.

It should be noted that the measured or monitored mannerism can be measuring time between successive, predefined input device entries and/or dwell time on individual input device entries. Also, the method includes supplementing the data accumulated over multiple sessions with the data accumulated over a given session after a user associated with the multiple session data has been identified, as shown in FIG. 4A at Step 206-6.

To return to FIG. 4, after assigning the unique identifier in Step 206, as described above, the consumer's entire Internet data will be routed to the service provider 102. The intermediary domain 102 can then copy or otherwise monitor the data (Step 208), and pass on the data into the Internet (Step 210) without impacting the overall data transfer rate from the consumer to the data's intended destination. According to one aspect of the invention, the service provider has predetermined the formats of the webpages for a set of domains, websites, and/or webpages that are of interest to the service provider. Thus, Internet traffic directed to or coming from these destinations/sources is monitored, and the data of interest filtered and collected. As other websites become of interest to the service provider, for example because consumers visit their sites, the service provider retrieves a copy of the particular webpages of interest, and determines the specific data format that the webpage includes. This determination of webpage formats can be performed manually or by an automated process, as will be readily apparent to one of ordinary skill in the art. As most webpages are formatted so as to conform with publicly known, standardized data transfer protocols (e.g., http, hypertext transfer protocol) or known scripting languages (cgi, Java™), determining the data format of most webpages will be well within the skill of one skilled in the art.

When the service provider is routed a copy of a webpage from either the consumer or a website, the service provider is able to copy the data contained in the webpage. By knowing the data format used by that website in creating the webpage, the service provider is then able to extract from the data the exact information detailing what sort of Internet transaction the consumer has just engaged in.

3) Filtering and Processing Collected Data

Notably, the intermediary domain 102 does not impede the transaction, but merely extracts the data about the transaction, and passes the data on to the intended recipient. Referring to FIG. 4, the extracted data is then filtered for data elements of interest to the service provider, such as the date and time of the transaction, URL of a click-through (e.g., on a banner ad), amount of money spent, type and number of items bought, delivery method, and so on (Step 212). The data record for that particular consumer is then updated with the information (Step 214). As will be readily appreciated by one of ordinary skill in the art, when more than one consumer has her Internet data routed through the service provider, the service provider can generate a database of consumer Internet activity of great detail about any single consumer's habits, any class of consumers differentiated based on any common characteristic in the database, any single domain, website, or webpage, and/or any class of domains, websites, or webpages which share a common characteristic in the database.

The foregoing description regarding data collection also applies to "push" and "broadcast" Internet technologies that operate on the same principle of the Internet consumer requesting data and the content server delivering data to the Internet consumer.

Several specific implementations of methods in accordance with the present invention will now be described.

While the following are specific implementations of methods according to the present invention, the present invention is not limited to the specific methods described herein.

A measure or metric can be established and generated from the data collected by the service provider, such as a dollar per thousand hits on a particular webpage ("$/K metric") (Step 216). The $/K metric therefore can indicate how much money is generated or received per one thousand times the particular webpage is served to any person on the Internet. The SIC metric provides a useful measure for an Internet content provider and/or an Internet advertiser of how to price advertising rates, or how much to pay for Internet advertising, respectively, based on the cost per thousand hits (CPM) versus the revenue generated by the Internet advertiser per thousand hits (RPM). Furthermore, while a single Internet merchant can generate its own CPM and RPM values based on the $/K metric, that Internet merchant does not have the data to compare to its competitor's CPM and RPM. Thus, the service provider practicing methods in accordance with the present invention will be able to market and sell $/K metric data to Internet merchant competitors without relying on the merchants themselves for the data.

In another aspect of the invention, a log of Internet activity ("weblog") can be generated from the data collected by the service provider (Step 218). The weblog can include a listing of the particular URLs visited by consumers, separate from the data indicating the consumers' transaction habits.

3a) Interstitial Traffic Monitoring

Figure 4B:
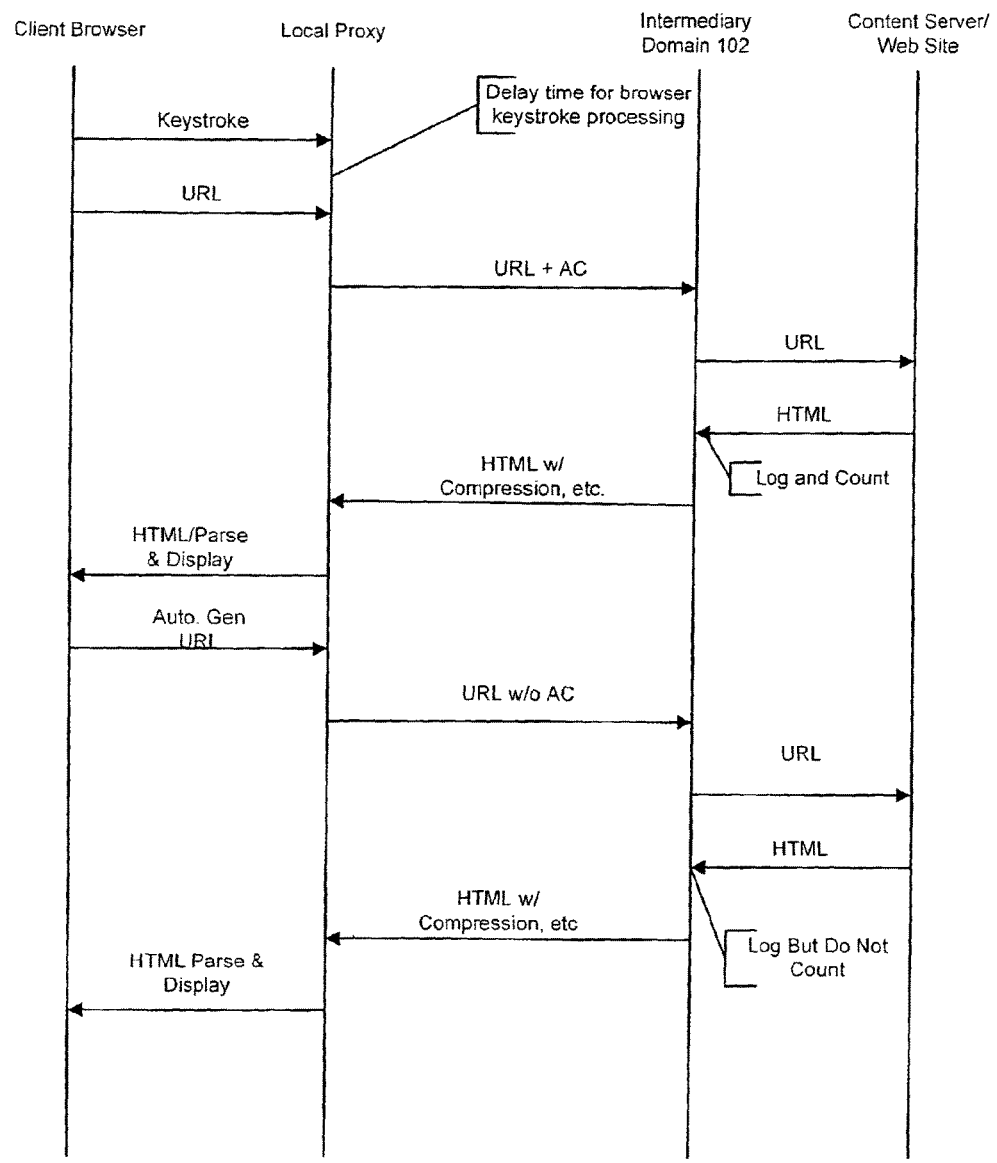

As illustrated in FIG. 4B, as part of the process of generating a web log of the data collected by the service provider, as shown in Step 218 of FIG. 4, it is valuable to distinguish between user-requested content and content that is automatically generated. For instance, user-requested content might be an article from the Wall Street Journal. Typically when replying to a request for content (e.g., URL), content servers 22, 24 and 26 will provide additional instructions in the HTML code which is returned to the client. These additional instructions cause the browser software to automatically generate URL requests, the replies to which typically take the form of pop-up advertisements, pop-under advertisements, banners, etc. This information is not requested by the user and therefore does not necessarily reflect the user's interest.

The present invention includes the ability to monitor the traffic and segregate the information requested by the user from the information automatically generated at the server side.

As illustrated in FIG. 4B, the present invention monitors for the activation of a keystroke or mouse click, for instance. If within a predetermined number of microseconds (representing the delay in processing the request in the browser software), a URL (e.g., http:/www.comscore.com) is generated, then that URL is distinguished from other URL requests. In this event, a special code is appended to the URL request, such as an action code (AC) as used in one implementation of the present system. This action code AC is appended to the URL request at the local proxy within the PC 12. However, for a monitoring mechanism it can be implemented at the gateway proxy 18, for instance.

The local proxy within the PC 12 then transmits the URL plus the action code AC to the intermediary domain 102. At this time, the intermediary domain 102 notes the URL request as special, strips off the additional code AC and forwards the URL to a content server 22, 24, 26, for normal processing.

The content server 22, 24, 26 then returns an HTML, file perhaps with an imbedded URL request, for instance. At this time, the proxy servers at the intermediary domain 102 log and count the URL request and returned content as user requested content. Thereafter, the HTML is forwarded to the client PC 18, generally compressed in accordance with other aspects of the present invention. The HTML request is received at the local proxy within the PC 12 and forwarded to the browser software for parsing and display. During the parsing operation, the browser may automatically generate further URL requests from the HTML code representing pop-up ads, pop-under ads, and other types of content not specifically requested by the user. This automatically generated URL request is then sent to the local proxy. Because it was not preceded by the activation of the enter key or mouse click within so many milliseconds, it is identified as not being an automatically generated URL request. Therefore, the URL request is forwarded to the intermediary domain 102 without an additional code AC. This URL may be logged at the intermediary domain 102 because monitoring what content reaches the user is of interest, but it is not counted as user requested information. The URL is then forwarded from the intermediary domain 102 onto a content server 22, 24, 26 where the process of returning HTML codes to the intermediary domain 102, then onto the local proxy of the PC 12, in the normal course.

It is noted that the monitoring and filtering of the URL request and reply HTML in accordance with this aspect of the invention can take place within the PC 12. Stated differently, when a URL request is preceded within so many milliseconds by an enter key keystroke or mouse click, that URL can be recorded together with an additional code to signify that it was a user, generated request. Thereafter, when the HTML reply returns to the computer, the content can be logged and counted as user requested content.

It should also be noted that the present invention can be employed within the content server insofar as the PC 12 can append the code to distinguish a user generated URL request, as opposed to an automatically generated URL request, although the usefulness of the invention may be diminished insofar as it is the content servers 22, 24, 26 that generally provide the automatically generated URL's in the first place.

As can be seen, this aspect of interstitial traffic monitoring greatly facilitates the improved accuracy of the information used in monitoring traffic by differentiating between user requested content and automatically generated content. This is particularly useful when identifying dwell times insofar as the user may only be interested in the requested content while additional pop-up ads are being displayed.

This aspect of the present invention can also be used in other endeavors, such as the elimination of pop-up ads and pop-under ads or otherwise elimination of display of any non-user requested information. Further filtering of the automatically generated URL requests may be necessary insofar as the requested content may have imbedded URL requests in the HTML for additional content desired by the user, such as a photograph accompanying an article, for instance. This additional filtering can be in the form of checking the automatically generated URL's against a database of URL's known to provide only advertisements and other content not generally requested by users.

3b) Two-Step Encrypted Communications

According to yet another aspect of the present invention, secure Internet transfer protocols can be used between an Internet consumer and an Internet content provider while still monitoring and collecting data about the user's Internet activities. As readily appreciated by one of ordinary skill in the art, when an Internet consumer initially requests a secure webpage, the consumer is sent an encryption key to enable encryption and decryption of webpages sent respectively to and from that website. Thus, other machines on the Internet are unable (in theory) to effectively interpret the data passing between the Internet consumer and the website when in a secure mode.

Figure 5:
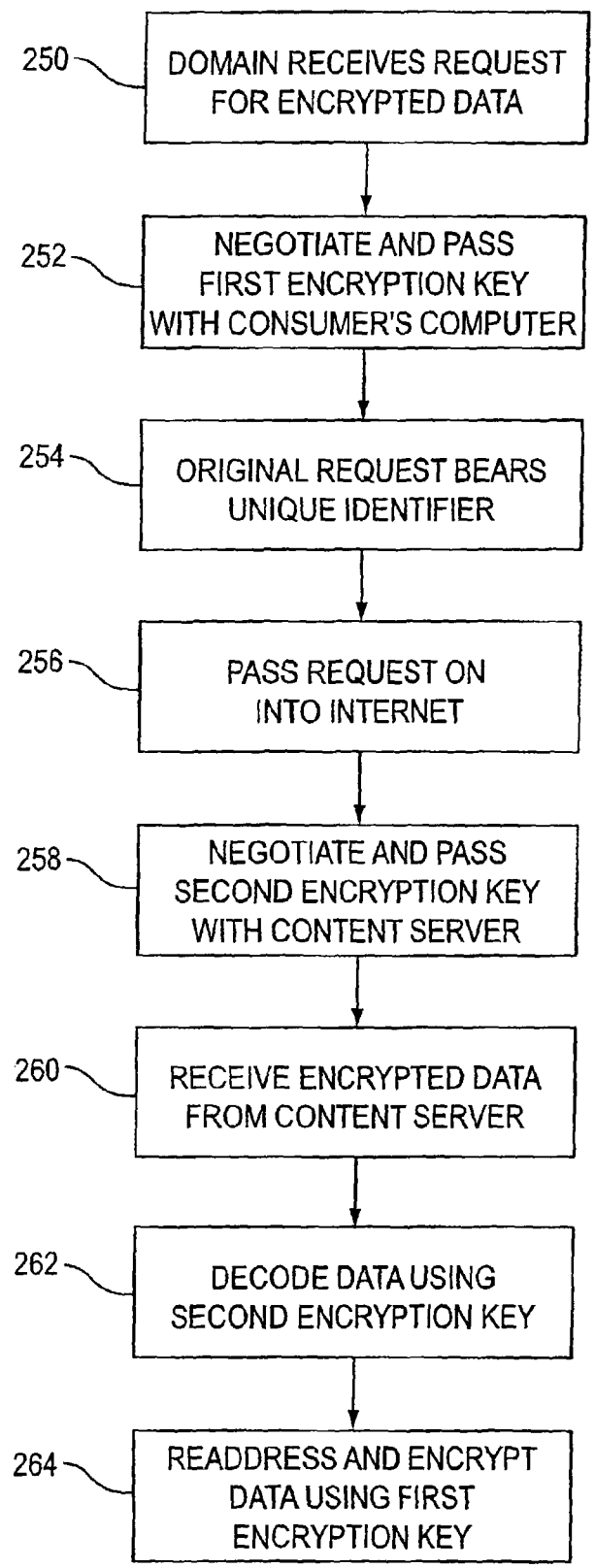

Systems in accordance with the present invention accommodate secure/encrypted communications while still monitoring Internet usage and enabling data collection, as diagrammatically illustrated in FIG. 5. For example, a proxy server of the intermediary domain 102 can include two servers: proxy server 106 for transferring encrypted data to and from the PC 12, and the proxy server 108 for transferring encrypted data to and from server 22 (for example). As will be readily apparent to one of ordinary skill in the art, servers 106 and 108 may be the same proxy server functioning as described above. Thus, when the intermediary domain 102 receives a request for an encrypted webpage from the PC 12 (Step 250), server 106 can negotiate and pass its own encryption key to the PC 12 (Step 252), thus initiating a secure session with computer 12. The original request from the PC 12 bearing the unique identifier for the consumer on the intermediary domain 102 (Step 254) is passed back into the Internet by server 108 to be received by computer 22 (Step 256). The computer 22 and server 108 negotiate an encryption key for the data 28, and the encryption key is passed back to server 108, bearing the consumer's unique identifier in the intermediary domain 102 (Step 258).

When encrypted data 28 is sent by the computer 22 and received by server 108 (Step 260), the server 108 decodes the data using its encryption key (Step 262). The server 108 passes the decoded data to a second proxy server 106, which readdresses the data for delivery to PC 12 at its IP address from gateway computer 18 and encrypts the data using the encryption key held by proxy server 106 (Step 264). Thus, proxy server 106 securely transfers data to and from computer 12, proxy server 108 securely transfers data to and from computer 22 for the consumer, and servers 106 and 108 exchange the decoded data. In one implementation of the present system, servers 106 and 108 are the same server which performs the operations and functions described above. According to another implementation, proxy servers 106 and 108 are different servers, which separately perform the operations and functions described above.

4) User Demographic Reporting

User Demographic Reporting (UDR) matches each user session to a specific demographic break, such as age and gender. The identity of a machine used to surf may be determined based on an indicator known as 'browser_idc', or a modified language tag as identified above. (Step 604) In addition, the identity of the actual demographic characteristics of who is surfing may be determined. (Step 606)

Specifically, in one implementation, UDR leverages three primary sources of data that currently maintain some or of several User Demographic Reporting indicators, (Step 606 a) By processing these data sources and providing logic that matches each indicator to a specific member within a household for instance, a complete demographic scope of surfing behavior is maintained throughout a user monitoring system in accordance with the present invention. (Step 606 b) Herein, users are grouped together in households, but it will be understood that the groupings can be with respect to businesses, within businesses or virtually any grouping of people however determined.

The UDR indicators may include: first name, last name, email, login/screen name, gender, and birth year, for example, but can include additional or different information that might be of particular interest. First name, email and login/screen name tend to be unique within a given household or other user group. Gender and birth year supply the two main demographic breaks in which surfing activity is reported. The last name acts as a statistical measure and validation for other UDR indicators within a given household. In this exemplary implementation, the first name is the driver behind other indicators—as it primarily identifies a person within a household. As such, other critical indicators such as email and login/screen name follow a set of logical rules that can match on a first name within the household. Gender and birth year act as supplement indicators that provide support to the other critical elements. In addition, gender and birth year are the two final demographic breaks that each site session is assigned.

Three primary sources of data include: the registration database, the transaction data (both ecommerce and non-ecommerce transactions) and a data source known as UDR Form Data herein with respect to this exemplary implementation. The UDR Form Data comes from monitoring sites for when a user enters personal information such as on a form or online sweepstakes entry. Three sources may be brought together as one master UDR "Dictionary" that contains any UDR information for each member within the household, non-members of the household or user group may also be maintained within this "Dictionary" as "dummy" members, because the goal is not to portray the size of a household, but to identify the person who was surfing during a site session.

Other secondary sources of data may serve as supplements to the primary sources. Such secondary sources include: a name-pseudonym and name-gender lookup table that may allow several pseudonyms to match on one first name currently registered within a database of panelists and to identify the gender of members or "dummy" members when no gender is present in any of the three sources, but a first name is presented to us.

A second supplemental source includes a tool that scrapes the screen name for when a user logs into AOL and/or CompuServe. A large number of online home population use AOL and/or CompuServe, and this tool enables capture of the login for AOL/CompuServe users. This may supplement the UDR Form Data source with login/screen name collection. The AOL/CompuServe screen names may be ultimately collected within the UDR Form Data once the tool captures the screen name from a user's sign-in. In addition, other screen names viewed using a complex Java script may be collected via decrypting sources and ultimately collected within the UDR Form Data once decrypted. Such an example is the Yahoo! screen name.

In summary, the UDR indicators undergo extensive matching and updating processes in order to effectively identify an individual surfing during a given site session. Primary and supplement data sources may remain apart from any "live" registration or production databases so as not to affect other reportable data and therefore stores in a separate database containing the UDR "Dictionary".

The UDR "Dictionary" is built and maintained from the primary sources (also supplemented by the secondary sources mentioned above) into one master normalized table that is handed off to information processes. From these efforts, the specific demographics for each user session can be reported, for instance, by age and/or gender.

4a) The Primary Sources (Data Inputs): Registration Database, Transaction Data, UDR Form Data 4a1) Registration Database The registry data is a primary source of User Demographic Reporting (UDR) that may match against other forms of inputs. Five UDR indicators have been selected in this exemplary implementation as ways to personally match a person to a user and site session: first name, last name, email, gender and birth year. In addition, the browser_idc and person_id are carried over to distinguish members within each household (browser_idc).

The 'person_id' is generated from combining a 'panelist_id' and a 'member_id'; both found within the registration database. In order for the registration data to be used in a workable and updateable manner without the risk of tampering with the primary registration database, a separate database may serve as a replica to the primary registration database that may house only the five UDR indicators and their corresponding browser_idc and person_id. This replica is called the UDR "Dictionary" herein. The UDR "Dictionary" may maintain known indicators for each person within the household. The UDR indicators may represent UDR information collected from the registration database, transaction data and the UDR Form Data process (further described, infra). Thus, the "Dictionary" may maintain known unique values for each UDR indicator per member within each household.

For example, member "john" might have two different email addresses and both of which are maintained within the UDR "Dictionary" for "john". The initial load of registry data (the registrants) extracts only those current active households (browser_idc) and members within the household in addition to their corresponding UDR indicators in an implementation where this processing occurs at the server side. This processing, however, can take place on the client side.

These households and corresponding UDR indicators load into the UDR "Dictionary" and are then updated with new households daily. The updates only occur to the "Dictionary". The primary registration database is not updated during this process; only extractions of data occur to the registration database. Thus the UDR "Dictionary" serves as a subset of data from the primary registration database containing only the five (5) UDR indicators and corresponding browser_idc and person_id for current active households.

This process involves the extraction of UDR indicators and household information (browser_idc, person_id) from an initial registration database (which is a mirror of the primary registration database) into a UDR "Dictionary" as described above. The "Dictionary" is a normalized view of the registration database information and thus creating a separate row/record for each UDR indicator for each person within the household. Each UDR indicator is assigned a "string_type" value represented as a single character value: first name=f, last name=n, email=e, gender=g, birth year=b.

The result is a normalized table stored on a data server with the following fields: panelist_id, member_id, browser_idc, string_type, string, match, source. Panelist_id and member_id may make up the person_id; browser_idc represents the household identifier; string_type represents the type of UDR indicator (first name, last name, etc.); string represents the value within the registration database for that 'string_type'; match may act as a counter that tracks the number of hits per string by string_type within the household; and source represents the original source of the string for that string type. In this case, the source may be 'registration database', symbolized as 'r'. Thus, for a record with more than one UDR indicators available may normalize to the example shown in FIG. 6A.

Only those UDR indicators that are not <NULL> for the member within the household are extracted—so, if a member has the first name and last name populated, only those two indicators are extracted and populated into the UDR "Dictionary"—the remaining indicators that are <NULL> (email, gender, birth year) do not get loaded into the "Dictionary" for that specific member. However, these indicators potentially could get updated with the extraction of other sources (transaction data and UDR Form Data as outlined in the sections below).

One exception to this rule is possibly gender—which can be identified by matching the member's first name to the name-gender lookup table and therefore, populating the gender string type for this particular member. This could later be changed, however, if another gender is identified for this person through the UDR Form Data as outlined in the UDR Form Data section below. Despite <NULL> values being ignored during the load process, the person_id (panelist_id and member_id) are still transferred over to the UDR "Dictionary" to serve as a holding place for when UDR indicators are identified via the other two sources of data (transaction and UDR Form Data) and then fill in the holes for the members who have no UDR information associated with them. Once the initial load of the current active registrants are populated into the UDR "Dictionary", a daily update may be implemented that identifies any new households (browser_idc) from the most recent site sessions matched to the registration database that do not currently exist in the UDR "Dictionary". This daily update may further enhance the "Dictionary" as a good representation of current active households and corresponding household members.

4a2) Transaction Data

The transaction data is a way to leverage the transactional information (both ecommerce and non-ecommerce data) into the UDR process. Since several transaction types collect UDR indicators (mostly name and email), it is important that this information is extracted to enhance the UDR "Dictionary" and to further increase the user/site session match based on the UDR indicators. The UDR information from the transaction data may be extracted by pulling browser_idc and their matching UDR indicators. It is possible to collect the following UDR indicators within the transaction data: first name, last name, email and date of birth/birth year in some of the more recent non-ecommerce transaction types. Each indicator searches through the UDR "Dictionary" for a match based on the browser_idc and UDR value. When a match occurs, the "match" counter within the UDR "Dictionary" may be incremented by one. When a match does not occur, a new member is created within the UDR "Dictionary", but not the initial registration database. FIG. 6B diagrams the matched scenario.

The end result may be added match counts for each collected UDR indicator within the transaction data. The initial load of the transaction data and update to the UDR "Dictionary" may incorporate historical raw transaction records within the systems. This includes ecommerce and non-ecommerce transaction types.

Figure 6C:
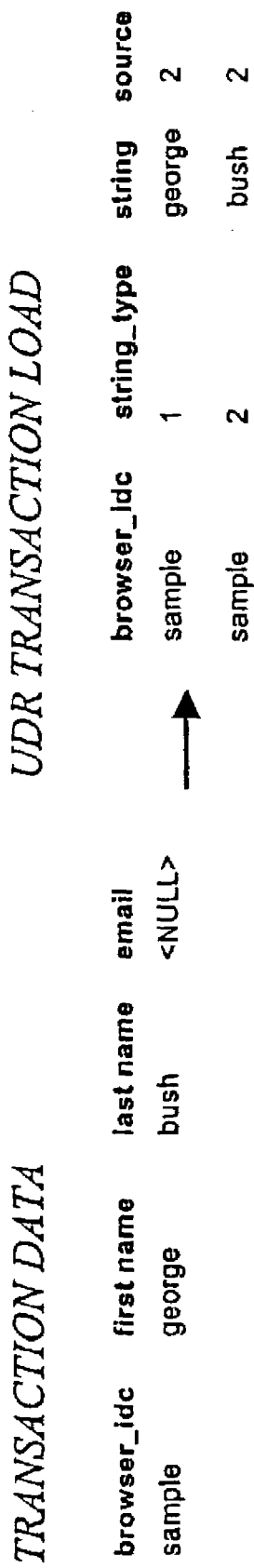

This process may begin by loading the historical raw transaction data for transactions. The data loads into a raw table on a database ('im_UDR' database) with the following fields: url_key, browser_idc, string_type, string, source. Url_key representing the distinct address of the page from the servers; browser_idc representing the distinct household;

string_type representing the UDR indicator (first name, last name or email); string representing the actual value for the UDR indicator; source representing the origin of the string by string type (e.g., "2" for transaction data). The string types are collected through the transaction data representing several transaction types: first name (string type=1), last name (string type=2), date of birth/birth year (string_type=4) and email (string type=3). In the event multiple string types are captured for the same transaction record, a separate row is generated for each captured string as shown in FIG. 6C.

Once the transaction data is loaded into a database, the string types and corresponding strings are matched against the UDR "Dictionary" for each browser_idc. When a match occurs, the "match" field within the UDR "Dictionary" is incremented by one for that string and string type. When a match does not occur, a new person_id may be created within the UDR "Dictionary", thus creating a new member for that browser_idc and setting the "match" counter to one for that specific UDR value and string type—and creating a "source" indicator of "2" for transaction data. Diagrammed in FIG. 6D is how the transaction data is matched to the UDR "Dictionary".

Figure 6E:
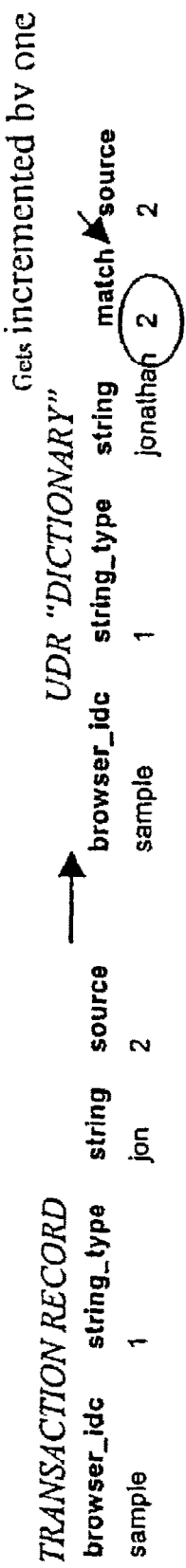

For matched on first name, another step takes place during the transition from the transaction data to the update of the UDR "Dictionary". The first name collected in the transaction data is matched against a name-pseudonym lookup that identifies any pseudonyms for a specific first name—and vice versa. For example the name "john" that is collected in a transaction record is looked up in the name-pseudonym table for "john" as the first name and pulls out any corresponding nicknames (Johnny, jon, etc.). And vice-versa, the name 'john' is looked up in the name-pseudonym for 'john' as a pseudonym and pulls out any corresponding first names (johnathan, jonathan, etc). The list of possible names and pseudonyms identified on 'John' are then matched against the UDR "Dictionary" for a match (by its corresponding browser_idc), and if a match exists, the 'string' in the UDR. "Dictionary" is retained and the 'match' field is incremented by one. Below is an example as shown in FIG. 6E.

Therefore, the string within the UDR "Dictionary" remains static unless a higher ranking source captures the string (first name for example) and matches it in the UDR "Dictionary" through the name-pseudonym lookup—at that point the string is replaced with the string collected from the higher-ranking source. For example, if "jon" had been collected from the registration database and a record already existed in the UDR "Dictionary" for "Jonathan" that had a source code of "t" for transaction; then "jonathan" may be replaced with "jon" since the registration database serves as a higher ranking source than the transaction data.

The end result of the transaction data load and update process is a system that continually adds hit counts to the UDR "Dictionary" for string and string types by browser_idc. It also serves as a way to artificially add members to the browser_idc (household) within the UDR "Dictionary" while not updating the actual registration database and thus increasing the overall coverage to the site and user sessions for each person surfed. It may allow us to not remain dependent solely upon the registration database because the assumption is, we do not care if they are an actual member of the household or just a guest purchasing an item on the household's computer—all we care about is who (UDR indicators) was surfing during that session.

4a3) UDR Form Data Process:

The "name=value" pair may identify users based on personal level information that is entered online by the panelist. This typically occurs when a user fills out a form online, submits a request or other occurrences that would call for the user to enter personal level information such as their name, email, gender, login/screen name or date of birth. An analysis was done on major sites that ask for personal level information (sweepstakes sites, form filling sites, registration sites, etc.) to identify how these occurrences are captured through the proxies. Essentially, the occurrence of someone entering his or her first name, for example, is captured through the representation of a 'keyword' that is assigned by the domain to acknowledge this to be a 'first name' value. The analysis built a set of keywords based on the tested domains for each of the five personal level categories (name, email, login/screen name, gender and date of birth). The assumption is that these are common keywords not only used by these major sites, but other sites across the Internet world. Some keywords include:

| Category | Keyword |
| --- | --- |
| Name | first_name, fname last_name, lname, first, last |
| Email | email, user email, recipient_email, member-email |
| Login/Screenname | login, account name, signin, screenname |
| Gender | gender, sex, male, female, int gender |
| Date of Birth | dob, birthday, birthyear, b_year, b_month |

The collection of these keywords and corresponding values may be captured at the proxy level or client level and then undergo some series of business rules/logic that weeds out useless data and sorts the raw records into a workable model. The processed data may then be matched to the registration database to identify the member within the household to which it belongs. If no match exists, a "dummy" person is created within the matched browser_idc. This match to the registration database and addition of "dummy" members may occur in a staging area within the local systems—not to interfere with the actual registration database.

This process scans the XML files at the proxy level for specific keywords in the post or query data. These keywords are assigned terms by the site for when someone fills out a form by entering data or selecting pre-determined values. Once the user fills out the online form and "submits" the form, a series of "post" and/or "query" data is returned that is not viewed by the user but viewed through the proxies and each keyword is followed by an "=" sign followed by the value entered by the user. So, a simple online form might return a url string that looks like this:

http://www.domain.com/url_directory/url_page.asp?first_name=Someone&last_name= Else&title=Mrs.& current_last_name=New&email=testing@testing.com&verify_email=testing@testing.com&zip=22015&password=testing What the process does is scan these URLs and pulls out the full post or query data string (everything after the "?") when the string contains one of the keywords. The page's demographic information is also extracted (e.g. browser_idc, url_id, time_id, domain_name, url_host, etc). Each match on one of the keywords is tagged with a single-character value that identifies a specific post or query data value as a match. There are five (5) single character values representing the five different categories of UDR data (name, email, gender, login/screen name and date of birth). These five categories are as follows:

| Single-Character Value | String Type |
|---|---|
| n: | name |
| e: | email |
| l: | login/screenname |
| g: | gender |
| b: | date of birth |

For each string type, several keywords may exist. Once the scanning process identifies a url's post or query data matching on one of the keywords, the resulting post/query string that gets loaded into a data server looks like:

n:first_name=Someone&n:last_name=Else&title=Mrs.& n:current_last_name=New&e:email=testing@testing.com & verify_email=testing@testing.com& zip=220115& password=testing Once this data is loaded into a processor, an extraction or sorting process occurs. A process sorts the "string types" based on the single-character value and parses out the string into a workable table that allows for an easy update into the "staged" registration database. The sorting process creates an individual record for each occurrence of a string type and matches it to the corresponding page's uri_idc, browser_idc, and event_time. The end result of the sorting looks like this:

| url_idc | browser_idc | event_time | type | parameter | value |
|---|---|---|---|---|---|
| Sample | Sample | sample | n | first name | Someone |
| Sample | Sample | sample | n | last name | Else |
| Sample | Sample | sample | n | current_last_name | New |
| Sample | Sample | sample | e | email | test@testing.com |

Where 'type' is the "'string type'" of the match, 'parameter' is the assigned post/query keyword and 'value' is the entry on the for by the user. Each record then matches based on browser_idc to the staged registration database (the "Dictionary") and looks for a match on any of the values for each parameter. When a match occurs, the remaining values for the same person are inserted into the "Dictionary" and a counter is tagged for each parameter increasing by one. So, if in the "Dictionary" the following information is available:

| Panelist_id | browser_idc | string_type | string | match |
|---|---|---|---|---|
| sample | Sample | 1 | someone | 1 |
| sample | Sample | 2 | else | 1 |

Note: "match" is the counter that keeps track of the number of hits per value per string. Since we are separating first and last name in the "Dictionary", 'f' has been assigned to represent first name and 'n' represents last name—in the raw "name=value" pair process, "n" represents either first or last name. Then when the process matches the collected "name=value" pairs and matches them to the registration database the end result of the "Dictionary" looks like this:

| Panelist_id | browser_idc | string_type | string | match |
|---|---|---|---|---|
| sample | Sample | 1 | someone | 2 |
| sample | Sample | 2 | else | 2 |
| sample | Sample | 2 | new | 1 |
| sample | Sample | 3 | test@testing.com | 1 |

4a4) The User Demographic Reporting (UDR) Indicators: First Name, Last Name, Email, Login/Screen Name, Gender and Birth Year 4a4i) UDR Indicator 1: First Name The first name drives the identification of a person to other demographic breaks. It can be identified in email addresses, login/screen name entries, matched to various pseudonyms and in most cases a gender can be applied to a first name. First name collects in three primary sources: registration database, transaction data and the UDR Form Data. The first name collected from the registration database may update the UDR "Dictionary" for each member within a household where first name is not <NULL> or not "Member". The first name is also updated to the UDR "Dictionary" from the transaction data and UDR Form Data when presented. First names collected from these two sources undergo a name-pseudonym match for possible pseudonyms in addition to a name-gender match for updating the gender portion of the "Dictionary". FIG. 6F is an example of a pseudonym match.

FIG. 6G is an example of how the name-gender match can be applied. An additional panelist_id/member_id is generated for "michael" and updated with "M" as gender (if the name is not found within the name-gender lookup (ambiguous names), then only the name is added to the "Dictionary", and gender is left blank). See FIG. 6H. End result: panelist_id/member_id for "michael" is generated as a "dummy" id and applies to the given session. The system is then able to identify the gender of this session, but not age.

Furthermore, the first name can be matched against other UDR indicators such as email and login/screen name following some basic logical rules. This process and set of logical rules are defined in more detail within the "Email" and "Login/Screen Name" sections of this document.

4a4ii) UDR. Indicator 3: Email

The email address serves as three functions: 1. because of its uniqueness, the email can identify a person whereas a common indicator such as 'address' cannot; 2. the prefix to an email address (everything before the "@" sign) can be identified as a unique login/screen name for that person; 3. the first initial-last name of a person may search within the email prefix for updating the UDR "Dictionary" by identifying a first name. Therefore, in addition to its use as identifying a person when no other demographic information is presented during a site session, the email address can add UDR 'strings' for a given member within the household on as to help identify the person in later sessions based solely on a login/screen name or email prefix. FIG. 6I is an example.

FIG. 6I illustrates that whenever someone on the computer with the same browser_idc as "George Bush signs on to AOL as "elephant", the system identifies that as a login/screen name for "george bush" and assigns him that session. Without the email "breakout" of its prefix, the screen name, "elephant" is identified as a "dummy" person to the household and if no other UDR indicators are matched during the session, the session becomes un-identified. This scraping of the email's prefix occurs when transaction and UDR Form Data for email is presented/collected. As the email gets collected, a match for that email is searched within the UDR "Dictionary" and when found, the 'match' counter for that string_type is incremented by one for that string (email address) and the prefix of the email is parsed and generates a login/screen name (string_type '4') for that person (if the same login/screen name already exists then the 'match' counter for that string_type is incremented by one). If no match for the presented/collected email is found within the UDR "Dictionary" two logical steps occur: 1. the email prefix is parsed and matched against string_type "4" (login/screen name) within that household to identify the person to which the email belongs; and 2. if no login/screen name match exists within that household, then the first non-numeric character within the email prefix is labeled as "first initial" and the last set of non-numeric character values is matched against persons' last names within the household. The second logical step may use the "first initial-last name" match to identify a person within the household. When a match occurs as a result of either two logical steps, the original email presented/collected is updated to that person's member_id within the household for string type "3" (email), and the email prefix is updated to string_type "4" (login/screen name) as his/her login/screen name. FIG. 6J and FIG. 6K show a real-world example of how the email can serve these multi-functions. End Result: panelist_id/member_id for "george" is applied to the session solely based on the login/screen name, "elephant" which would otherwise not identify anyone specifically within the household.

Thereafter, the system can match an email based on a first initial-last name combination, as shown in FIG. 6L. End Result: panelist_id/member_id for "george" is applied to the session solely based on the unmatched email address, gwbush@whitehouse.com. (gwbush@whitehouse.com is also updated to the UDR "Dictionary" as string_type '3' for "george" and a login/screen name (string type 6) is created in the dictionary as "gwbush" in consideration for future email and/or login/screen name matches—thus the first initial/last name logic need only apply once.)

4a4iii) UDR Indicator 4: Login/Screen Name

The login and/or screen name is an identifier that a person enters when signing on to a particular online service such as an ISP, Internet email system or possibly a subscription service like wsj.com (Wall Street Journal). In addition, several internee email services or ISPs that offer email accounts may use the login and/or screen name as the user's email address prefix (e.g. a screen name of "johndoe" for AOL may assign an email address of "johndoe@aol.com" for this person). Also, the login and/or screen name can apply a logic that distinguishes a first and/or last name within the household for a login/screen name that is otherwise unmatched in the UDR "Dictionary". For this, the login/screen name serves three purposes: 1. to uniquely identify a site session with a member of the household when no other UDR information is presented during a session and the unique login/screen name is found within the UDR "Dictionary"; 2. to identify which member of the household a unique login/screen name belongs based on a first name or first initial-last name logic; and 3. create an additional "forced" email address for the person by applying a domain level logic. Much like the 'email' address, the login/screen name generates additional UDR strings in addition to its primary function of identifying the person surfing during his/her session.

The example of FIG. 6M illustrates how an additional email record is generated when a login/screen name is collected and matched within the UDR "Dictionary". By simply adding the "@" sign after the login/screen name and ending it with "domain.com", an email address is created for that person in the event "gwbush@msn.com" is collected either through a transaction or UDR Form Data record in the future. Similar to the email logic of leveraging the prefix to create a unique login/screen name for that person and to identify the person based on the first initial-last name logic, the login/screen name can apply a similar set of rules. Two logical steps occur when the collected login/screen name does not match in the UDR "Dictionary": 1. the login/screen name matches against email prefixes within that household to identify the person; or 2. the login/screen name uses the first non-numeric character as the "first initial" and the last set of non-numeric character values as the "last name"; together the combination matched against the person's last name within the household and identifies a person's first name from the first letter matched to the login/screen name's first initial. When a match occurs as a result of either two logical steps, the original login/screen name presented/collected is updated to that person's member_id within the household for string type "4" (login/screen name), and the mail (string_type "4) is added as an additional record by appending the "@" sign followed by "domain.com". FIG. 6N is an example of a real-world example of how the login/screen name logic applies. The end result is that the panelist_id/member_id for "george" is applied to the session solely based on the login/screen name, "elephant" which would otherwise not identify anyone specifically within the household.

Login/Screen Name can use the first initial-last name rule (UDR Form Data record collected through hotmail.com) as shown in FIG. 6O. End result: panelist_id/member_id for "george" applies to the session solely based on the login/screen name of "gwbush". Also, an additional email address is created for "george" in order to identify "george" to any future sessions where only "gwbush@hotmail.com" is collected.

4a4iv) UDR Indicator 5: Gender

Gender is one of the two other demographic breaks used in identifying user and site sessions. The process to update gender is much simpler than some of the other UDR indicators (first name, email or login/screen name). However, there are a few logical rules that apply when collecting gender—which is described within this section. Only two of the three primary sources collect gender: the registration database and the UDR Form Data.

First, the initial gender update may originate from the registration database. For each member of the household, the gender for that member may be loaded into the UDR "Dictionary" as either "m" for male or "f" for female. However, if a member within the registration database has a <NULL> entry for gender, then the first name (if available) is searched through the name-gender lookup table and a matching gender to the member's first name is applied. If no first name is available for the member and no gender is offered within the registration database—then no gender is applied to that member_id within the given household.

Second, gender is collected through the UDR Form Data as string type "g" (translated to "5" when applied in the UDR "Dictionary". Based on a set of keywords that identifies when a person enters gender information within "form" data (post and/or query data), a database located on a data server stores the collected values for "gender" entries. The gender is then grouped with other UDR information collected either in the same URL record or within a given site session so as to match the UDR information to the "Dictionary" and update the gender. If the gender for the matched member_id already exists, then the "match" counter for that string_type (gender) is incremented by one. If the gender for the matched member_id does not already exist, then the gender indicator is applied in the "Dictionary" and the "match" counter for that string_type (gender) is set to "1". FIG. 6P illustrates either example.

Gender is one of the UDR indicators that can be easily updated to any member_id within a household for those members who have first names. However, because gender is not as unique within a household as first name, email, login/screen name or even the birth year, it becomes difficult to match a session to a specific member within the household when gender is the only UDR indicator presented during the session. Though the system is able to identify one of the two final demographic breaks (gender) for the given session, updating the "Dictionary" to apply gender for a specific person is virtually impossible when more than one member of the same gender exists in the household. FIG. 6Q illustrates an example of how a "gender" item goes unmatched within the household for a specific member_id. The end result is that the process cannot match this gender to anyone in the household because it is inconclusive as to whom the record belongs.

However, the gender can be used in combination with other UDR indicators to match on a specific member_id within a household. For example, if the gender and birth year were collected within a session, and the birth year exists within the UDR "Dictionary" for a specific member_id, then the gender can be updated to that person where gender currently did not exist for such member_id. The same logic can be used when gender is combined with login/screen name, email address and obviously first name.

4a4v) UDR Indicator 6: Birth Year

The birth year is the second final demographic break that matches each surfer to a given user and site session. Much like the gender, birth year is very simple to update and includes straightforward logic as opposed to some of the more complex indicators such as: first name, email and login/screen name. Also, birth year is a more unique indicator as opposed to gender, and matching birth year to a person within a given household is more dynamic because the likelihood of two or more members within a household of having the same birth year is less likely than two or more members with the same gender. Birth year was chosen as the "birth" UDR indicator because it keeps logic and matching simple and the data type can remain more stable—one does not have different forms of data to manipulate (e.g., translating "07/07/1985" or "070785" or "Jul. 7, 1985" to "07-07-1985"). Rather, the logic primarily strips unnecessary data only to retain the birth year. And in the case of birth years collected in 2-digit format, the prefix 19 or 20 are pre-appended. Below illustrates some examples:

| Raw date of birth collected | Final Load to UDR "Dictionary" |
| --- | --- |
| 07/07/85 | 1985 |
| July 7, 1985 | 1985 |

The first step is for the string to identify the last 4 numeric characters of the string that is not broken up by any spaces or other non-numeric characters. Once these four numeric characters are identified, a "first 2-digit" validation occurs: the first two numeric characters must be a 19 or a 20. If this is true, then the characters are retained and updated to the UDR "Dictionary". If the validation returns false, then the last two digits are retained and a 19 is pre-appended. The next logical step (if the last numeric characters do not exist without a space or other non-numeric character breaking the string) is to identify the last two numeric characters and pre-append a "19" to the beginning of the two numeric characters. Once this logic of stripping/parsing the birth year from any date of birth record occurs, then updating the UDR "Dictionary" is simple.

If a match within the household exists for such a birth year, then the "match" counter is incremented by one, and the session can be applied to this particular member_id. If no match occurs within the UDR "Dictionary", then the birth year has to be used in conjunction with other collected UDR indicators that occurred during the same url record or session. For example, if birth year and first name, "john" are collected form the UDR Form Data, and "john" is found within the given household in the UDR "Dictionary"; then the collected birth year can be added to "john". This follows the same for when birth year is collected in conjunction with other UDR indicators such as: email, login/screen name and gender.

4b) UDR "Dictionary"

As detailed in previous sections, the UDR "Dictionary" is a table that makes up UDR indicators for every member for every household. These indicators are collected from the Registration database, Transaction data (both ecommerce and non-ecommerce data), and the UDR Form Data. This table may remain on a data server and may be called "UDR_registration", for instance. On a daily basis, this table is handed off to build their UDR "Streamids" process that matches the "Dictionary" information to real URLs during site and user sessions. Due to the size of the UDR "Dictionary" and it's subject to "extra" members from miscellaneous collected. UDR Form data, the handoff may be a filtered "Dictionary". The filtered "Dictionary" may include UDR indicators fir members within the household where the source is a "1" or a "2". Therefore, UDR indicators derived from the registration database and from the transaction data may be part of the filtered "Dictionary". In addition, UDR indicators for members within the household with a source of "3" and the thatch (which is a field that tracks the 'count' of hits for a particular UDR indicator for each UDR string type for each member within the household) is greater than five (5).

4c) Single Member Households

The idea of the 'single member household' data is to identify those households who are assumed to be one member deep and thus force that member to be assigned to any user session during which his/her household surfed and no other UDR data was scanned. First, a 'single member household' is assumed to be any household by which only one person uses the computer/machine for Internet (other than email) purposes. Various data sources and assumptions are utilized in order to build this set of households and 'single members' for the efforts mentioned above. This section may outline the different methodologies used to build this data set as logic has changed over time. There are 3 methodologies described below.

1) This methodology essentially looks at every household and each member's source of record. The process counts up the total number of member_ids within each household that have a source of 1 (registration data). Finally, only those households where exactly one member has a source of 1 are then passed off to the stream ids process that may force user sessions in the DW for these households when not other UDR data was scanned during the session. The member_id that contained a source of 1 is used as the default 'person_id' in the DW for user_session assignment.

2) The process to create a set of households and default member_ids for this methodology uses actual self-reporting of data as seen in the registration database. The process may first take active households in the registration database that are reported as a work or school machine. Secondly, active households in the registration database that are self-reported as "one-member households" (i.e., How many people are residing in your household?=1) are added to the work/school set of active households. This then creates the total number of households to be used when forcing a default member id into the user session table(s). In order to generate the default member id for each 'single member household' for this methodology, the collapsed members are utilized. Essentially, the collapsed member_id (a.k.a PLI_ID or master_id) that has the most number of collapsible 'persons' is used as the default member_id for this set of 'single member households'. This is because it is assumed that a collapsed member_id with many collapsible 'persons' is said to be the most frequent of 'persons' within the household.

3) The process to create a set of households and default member_ids for this methodology uses actual self-reporting of data as seen in the registration database in addition to those households whom completed the registration process and only one member of the household is in the registration database (i.e., single member registrants for multi-member households). The first step of the process uses methodology 1's logic. The second step of the process may identify those households within the registration database that completed the registration process (this is identified by using a field within the 'machine' table of the registration server that flags each household as having completed or not completed the registration process). Using these households, the process then identifies those households where only one member_id has a source 1 (registration). This set of households are combined with step 1 to create a final set of 'single member households'. In order to generate the default member id for each 'single member household' fir this methodology, the same logic used in methodology 2 is used for methodology 3 to identify the default person_id. This methodology includes methodology 2 and a subset of methodology 1.

5. Data Mining

Because the database generated can include data regarding consumer's demographics and the like, the database can be easily mined for data records having web hits on a particular website. This information is particularly valuable to that website's competitors, as it gives an indication of who is visiting the website, and what those individuals' characteristics are. Such "competitive intelligence" can be marketed and sold to a wide variety of parties, and in particular to the particular website's competitors.

In yet another aspect of the invention, an electronic commerce ("e-commerce") or retail price index, herein termed "EPI", can be generated from the service provider's database, based on any electronic retailer's ("e-tailer") data, mined from the database (Step 220). That is, the prices of particular products can be retrieved from the database, and the relationships between time and price can be generated to provide an indication of the true market price for an item or service, or of the condition of a market as a whole.

Referring again to FIG. 4, the service provider's database can be further analyzed or mined to extract data relating to the amount of revenue a particular website generates over a particular time period or a particular number of website hits (Step 222). Based on the sample size for the particular website of interest, and therefore within a known confidence interval based on known rules of statistical analysis, the service provider will be able to provide revenue projections over a given period of time for the website well in advance of the end of any particular time period or number of Internet visits. As will be readily appreciated by one of ordinary skill in the art, revenue predictions for a business are very useful tools for pricing securities for that merchant, and therefore the service provider can market and sell such revenue predictions to parties interested in knowing this information before release of the actual revenue reports by the website owner to the rest of the securities market. Furthermore, sales forecasts can be used by the Internet merchant for inventory control and just-in-time warehousing and delivery.

The database can also be analyzed for data representative of the frequency a particular website is visited (Step 224). For example, the data filtering performed on the raw Internet data received by the service provider can include tabulating the number of times a domain, website, or webpage is served to a consumer. By comparing this number to the number of times a purchase was made, a measure of the particular consumer's purchasing propensity can be generated, as well as the average amount spent per visit and per transaction. These measures can be marketed to e-tailers, or provided back to the consumer. Similarly, by retrieving from the database usage at a single website across the database, cross-selling success can be measured (Step 226). For example, for an e-tailer that sells products A and B, the database can be mined for transactions, for instance, between the particular e-tailer and consumers for product A, and the e-tailer's success in also selling product B to that same consumer set can be extracted. Thus, the success of the e-tailer to cross-sell products A and B can be readily extracted, and that information can be marketed and sold to competing e-tailers.

More traditional market research data can also be easily mined from the service provider's database of Internet consumer activity. For example, a particular e-tailer's total market share in a particular class of goods or services can be determined by extracting data of all transactions, for instance, in that class attributable to the particular e-tailer, as well as all transactions, for instance, for goods or services in the class. Similarly, for a particular consumer, the loyalty or share of the consumers spending ("wallet") spent at a particular c-tailer or for a particular product type can be easily extracted. The percentage of the entire consumer sample pool who visited or bought goods or services a specified number of times from a particular site can be determined, which represent the trial and repeat rates for both visiting and purchasing.

Profiling or generating scoring models can also be facilitated by the service provider practicing methods in accordance with stilt another aspect of the present invention. For example, the database can be used to provide data records for a particular consumer characteristic, such as education level (Step 228). This data set can be compared to broad demographic data sets including indicators of education level, to predict the overall probability of a certain Internet activity, such as buying a product or viewing a video, by persons at that education level for the entire population represented by the broad demographic data set (Step 230). Other comparisons of the service provider's database to other databases will be readily appreciated by one of ordinary skill in the art, to generate profiting data on a certain population's Internet activities.

Because of the particular systems and processes of the system described herein, statistically significant consumer data can be gathered at extremely low costs per panelist when compared with prior systems.

6. Performance Monitoring and Analysis

The typical web server 708 (FIG. 7) does a good job of providing content requested by users. However, most web servers do not provide the content as efficiently as possible. In addition, most web servers do not provide the system administrator 710 with enough log information to clearly understand the performance of the website.

The present invention addresses the performance and logging shortfalls of the typical web server 708 by providing a network appliance or device 706 (which can be the intermediary domain 102) that sits between the web server 708 and the browser 704. In this case, the user 702 requests content from the web server 708 as described above, however, the device 706 intercepts the request. By intercepting the request, the device 706 can log detailed information about the request. The device 706 requests the content from the web server 708 and receives the response on behalf of the web browser 704. Once the device 706 has the response from the web server 708, it optimizes the content where possible by providing HTML compression, for instance. In addition to the optimization, the device 706 can insert script into the response that will direct the browser 704 to report information about the request from the client perspective.

The device 796 encapsulates server-side performance information in the outgoing message. The client browser 704 combines client side statistics with the server side data and sends the combined package to a central server (707, FIG. 8) for processing and storage. The client processing is performed using browser 704 based code (VBScript, JavaScript), and the data is sent back to the central server 707 via one or more transparent GIF requests.

Figure 7:
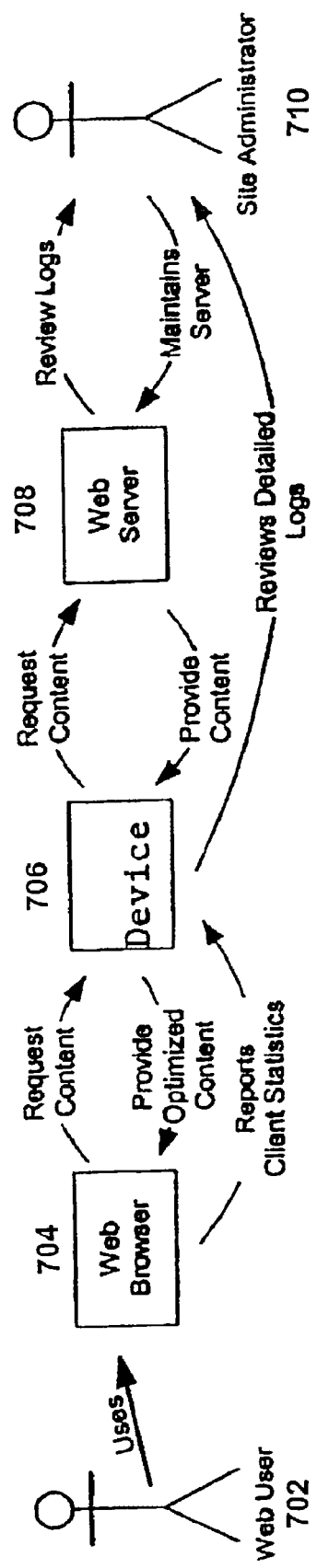
FIG. 7 schematically illustrates a performance monitoring and analysis configuration, as further described below.
Figure 8:
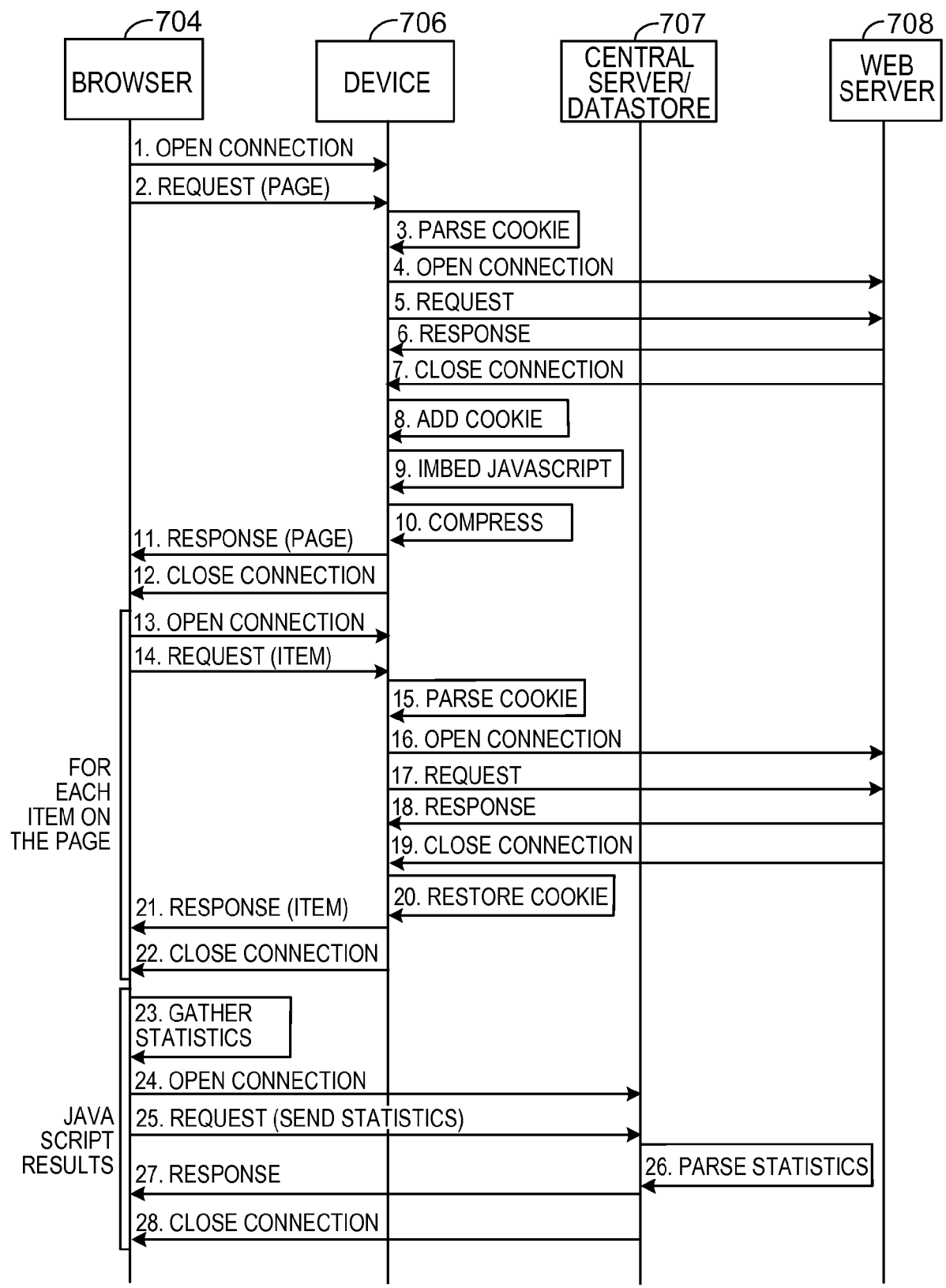
FIG. 8 diagrammatically illustrates steps of methods, as further described below.

The following, with reference to FIGS. 7 and 8, describe the solution where the web user 702 requests a page.

1) The request begins by establishing a TCP connection between the browser 704 and the web server 708. The device 706 intercepts this request and accepts the connection on behalf of the web server 708.

2) Once the connection is accepted, the browser 704 sends a request for the page and, optionally, requests the connection be kept alive.

3) The device 706 checks to see if the user 702 has a cookie issued by the device. If so, it parses the cookie, saves it for future reference, and strips it from the HTTP header. If not, it creates a new unique identifier for the user 702 and saves it.

4) The device 706 establishes a connection to the web server.

5) The device 706 forwards the user's request to the web server.

6) The web server 708 sends the requested page and logs the request.

7) The web server 708 may close the connection. It is possible that the web server 708 will close the connection even if the device 706 requested that the connection be kept alive.

8) The device 706 adds its cookie to the HTTP header and includes the unique identifier from step 3

9) If the content type is "text/html.", the device 706 may insert client script to evaluate the page performance from the browser.

10) If the content type is "text/*", the device 706 with compress the content.

11) The device 706 will return the modified response to the browser.

12) If the browser 704 requested that the connection is kept alive, the device 706 will leave the connection open. Otherwise, the connection will be closed.

13) For each item on the page, the browser 704 will request additional information from the web server. This information may be an image, applet, or other content served by the server. The browser 704 may use an existing connection already established with the server or it may open an new one.

14) The browser 704 sends the request for the additional content.

15) The device 706 checks to see if the user 702 has a cookie issued by the device. If so, it parses the cookie and saves it for future reference and strips it from the HTTP header. If not, it creates a new unique identifier for the user 702 and saves it.

16) The device 706 establishes a connection to the web server.

17) The device 706 forwards the user's request to the web server.

18) The web server 708 sends the requested item and logs the request.

19) The web server 708 may close the connection. It is possible that the web server 708 will close the connection even if the device 706 requested that the connection be kept alive.

20) The device 706 adds its cookie to the HTTP header and includes the unique identifier from step 16.

21) The device 706 will return the modified response to the browser.

22) If the browser 704 requested that the connection is kept alive, the device 706 will leave the connection open. Otherwise, the connection will be closed.

23) if client script was included in step 9, the browser 704 will gather statistics about the page as it loads.

24) The Browser 704 will open a connection to the central server 707 to send the statistics. The central server 707 will intercept this request and accept.

25) The browser 704 will send the statistics to the central server 707 by requesting a URL and including the statistics in the request.

26) The central server 707 will parse the statistics and store the information in the Central Data Store.

27) The device 706 will send a canned response to the browser.

28) The connection will close.

Thereafter, a system administrator 710 reviews logs, as follows:

1. The system administrator reviews the web server 708 logs.
2. The system administrator reviews the detailed web server 708 logs from the central server 707.
3. The system administrator updates content and tunes performance based on the information derived from the web server 708 logs and system information.

The system may enhance the user 702 experience by providing HTML compression and by maintaining connections even when the web server 708 does not support it. From the system administrator's point of view, the system may provide a significant amount of new information that can be used to evaluate the web server's 708 performance. Most importantly, the present invention provides information from the browser 704 about the time it took to render the entire page as well as the load times for individual items on the page. This information can be used in conjunction with other statistics such as abandonment to determine if page, or individual item, performance is the root of the problem.

The device 706 will insert code at the beginning and end of every target html page served through the device. The code inserted will contain server side data. Once the html/

JavaScript is fully processed by the client browser 704, the client side statistics are combined with the server side information and one or more transparent GIF requests are made to the central server. The central server 707 collects the information coming from the browser 704 and sends back a 1-pixel transparent GIF. The togged information is processed at the central server 707 and makes its way into the data store. The page performance, in aggregate or detail form, is available to the users of a reporting system.

The following records may be passed from the client to the server as part of the single pixel GIF request.

6a) Server-Side Performance Information

The IP address of the server the client is connecting to,

The time the first byte of the client s request is received by the device.

The time the first byte of the web server's 708 response is received by the device.

The content type returned from the server.]

The time to complete the connection between the device 706 and the web server.

The time the client s request was completely received by the device.

The time the web server's 708 response is completely received by the device.

The time that the device 706 sent the complete response after processing the filters.

The size of the request from the browser.

The size of the response returned from the web server.

A 2 byte status indicator for the device 706 that can be used to report system status.

The HTTP Protocol used for the connection.

The HTTP Method of the connection.

The HTTP Status returned from the server.

Specifies whether or not the device 706 compressed the content prior to sending it to the browser.

The size of the response from the device 706 to the browser 704 including the client script and the compression.

6b) Client-Side Performance Information

When a browser 704 reports page load statistics, the results are stored in the statistics log. The data contained within the request is divided in to one row per component, such as an image or applet, and one row for the pages itself.

6b1) Page Statistics

The unique id of the user 702 assigned by the system.

Counter that keeps track of the number of visits the user 702 has made to the web site.

The referrer page sent from the browser.

The time at which the data is sent to the central server.

The time the browser 704 received all the HTML.

The time the browser 704 loaded the entire page.

The status of the item.

6b2. Component Statistics

The unique identification of the user 702 assigned by the system.

Counter that keeps track of the number of visits the user 702 has made to the web site.

Type of component.

The time at which the TCP connection is requested.

The name of the item.

The status of the item.

Offset from page load start for when this component was requested.

The time to load the component.

The Size of the component if available.

6c) Central Server User 702 Interface

The central server 707 provides a web interface for the performance reports.

In conclusion, it is emphasized that the described systems, methods, and techniques may be implemented in digital electronic circuitry, computer hardware, firmware, software, or in combinations of these elements. Apparatuses embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and mm instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor may receive instructions and data from a read-only memory and/or a random access memory. Storage devices suitable for tangibly embodying computer program instructions and data include forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). It may be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

The invention claimed is:

1. A method of reporting user demographics, the method comprising:

receiving, by an intermediary computing device, data sets sent from a user computing device, the data sets being sent during an online session of a user of the user computing device, the online session being routed through the intermediary computing device;

accessing a plurality of data sources that include several user demographic indicators, the plurality of data sources including: (1) a registration database storing data received during a user service registration process, (2) transaction data detected by the intermediary computing device during online sessions of users of the intermediary computing device, and (3) a personal information data source collected by the intermediary computing device when a user enters personal information into a site during an online session;

supplementing the plurality of data sources with data from at least one secondary source of data, wherein the at least one secondary source of data comprises a name-pseudonym lookup table allowing several pseudonyms to match one registered first name;

building a master dictionary that contains demographic information for each member within a user group based on said plurality of data sources and said at least one secondary source of data;

matching the user demographic indicators to a specific user within a predefined group of users;

identifying the user among other users in a predefined group of users; and maintaining demographic information about the identified user related to data on network activity behavior of the identified user.

2. The method of claim 1, wherein the user demographic indicators comprise at least one of first name, last name, email, and login/screen name.

3. The method of claim 2, wherein matching the user demographic indicators to the specific user comprises matching a first name of a user in the predefined user group to other demographic indicators.

4. The method of claim 2, wherein the user demographic indicators further comprise at least one of gender and birth year.

5. The method of claim 4, wherein matching the user demographic indicators to the specific user comprises matching the user demographic indicators with a household identifier associated with the user.

6. The method of claim 1, wherein the personal information data source is collected by scanning a URL, transmitted during the online session, for a post or query data string.

7. A method of reporting user demographics, the method comprising:

receiving, by an intermediary computing device, data sets sent from a user computing device, the data sets being sent during an online session of a user of the user computing device, the online session being routed through the intermediary computing device; and matching the online session of the user to a specific demographic classification by:

identifying demographic characteristics of the user of the intermediary computing device by:

accessing a plurality of data sources that include several user demographic indicators;

supplementing the data sources with data from a name-pseudonym lookup table and a name-gender lookup table, the name-pseudonym lookup table matching pseudonyms to a registered first name and the name-gender lookup table identifying the gender of a user;

matching, based on data from the plurality of data sources, user demographic indicators to a specific user within a predefined group of users; and identifying the user among other users in a predefined group of users; and maintaining demographic information about the identified user related to data on network activity behavior of the identified user.

8. The method of claim 7, wherein the user demographic indicators comprise at least one of first name, last name, email, and login/screen name.

9. The method of claim 8, wherein matching the user demographic indicators to the specific user comprises matching a first name of a user in the predefined user group to other demographic indicators.

10. The method of claim 8, wherein the user demographic indicators further comprise at least one of gender and birth year.

11. The method of claim 10, wherein matching the user demographic indicators to the specific user comprises matching user demographic indicators with a household identifier associated with the user.

12. A computer-implemented method, comprising:

obtaining identifying information from a user during an initial registration process that solicits the identifying information from the user, wherein obtaining identifying information from a user includes:

receiving an indication from the user that the total number of users in a household is greater than one, and obtaining, during the initial registration process, identifying information from the user regarding each of the multiple users in the household including the user, the identifying information distinguishing the multiple users in the household from each other;

creating a source of indicators related to an identity of each of the multiple users including the user from the obtained identifying information;

accessing information received by an intermediary computing device and included in multiple requests for data made during an online session of the user, the multiple requests for data being configured to retrieve information from multiple, different websites specified by the user over a period of time and the multiple requests including multiple indicators related to the identity of the user, the online session being routed through the intermediary computing device;

accessing one or more sources of indicators related to the identities of the multiple users in the household, the one or more sources of indicators including the source of indicators related to the identity of the user created from the obtained identifying information;

supplementing data in the one or more sources of indicators with data from at least one secondary source of data, wherein the at least one secondary source of data comprises a name-pseudonym lookup table allowing several pseudonyms to match one registered first name;

analyzing, after the online session of the user, the multiple requests to identify the multiple indicators related to the identity of the user;

comparing the identified indicators to the indicators in the one or more accessed sources of indicators to determine which of the multiple users in the household initiated the requests for data during the online session;

identifying the user, from among other users in the household, as the user that initiated the requests for data during the online session based on the comparison; and associating the online session with at least one demographic characteristic of the identified user in response to identifying the user from among the multiple users in the household as the user that initiated the requests for data.

13. The method of claim 12, wherein the source of indicators comprises a registration database that receives data during the initial registration process.

14. The method of claim 13, wherein the source of indicators further includes transaction data which is collected by the intermediary computing device during the online session.

15. The method of claim 14, wherein the source of indicators further includes a personal information data source which comes from monitoring sites for when a user enters personal information.

16. The method of claim 15, further comprising building a master dictionary that includes demographic information for each member within the household based on the sources of indicators and the secondary source of data.

17. The method of claim 12, further comprising supplementing data in the sources of indicators with data from the at least one secondary source of data scraped from user logon process steps.

* * * * *